United States Patent [19]
Ohki

[11] Patent Number: 5,453,791
[45] Date of Patent: Sep. 26, 1995

[54] BLOCK MATCHING TYPE MOTION COMPENSATION ENCODER WITH CONTROLLABLE PREDICTIVE QUANTIZER

[75] Inventor: Junichi Ohki, Tokyo, Japan

[73] Assignee: NEC Corporation, Tokyo, Japan

[21] Appl. No.: 965,692

[22] Filed: Oct. 23, 1992

[30] Foreign Application Priority Data

| Oct. 25, 1991 | [JP] | Japan | 3-279541 |
| Oct. 30, 1991 | [JP] | Japan | 3-285060 |
| Jan. 8, 1992 | [JP] | Japan | 4-001159 |
| Jan. 22, 1992 | [JP] | Japan | 4-009133 |

[51] Int. Cl.$^6$ .................................................. H04N 7/36
[52] U.S. Cl. .................................................. 348/416
[58] Field of Search .................................... 358/133, 136, 358/135, 138; 348/416, 415, 409, 407, 420, 402, 401, 400, 390, 384; H04N 7/137, 7/13

[56] References Cited

U.S. PATENT DOCUMENTS

| 2,909,600 | 10/1959 | Becker | 358/138 |
| 3,359,365 | 12/1967 | Kihara | 358/133 |
| 3,887,763 | 6/1975 | Hinoshita et al. | 358/133 |
| 4,562,468 | 12/1985 | Koga | 358/136 |
| 4,951,140 | 8/1990 | Ueno et al. | 358/136 |
| 5,025,482 | 6/1991 | Murakami et al. | 382/56 |

FOREIGN PATENT DOCUMENTS 55-158784  12/1980  Japan .

OTHER PUBLICATIONS

Koga et al., "Motion–Compensated Interframe Coding for Video Conference", Communication System Study Group Pamphlet, CS 81–87, pp. 85–90, published Jul. 22, 1981 by the Institute of Electronics and Communication Engineers of Japan.

Koga et al., "A 1.5 Mb/s Interframe Codec with Motion Compensation" (numbered 83CH1874.7/83/0000.1161), IEEE International Conference on Communications, Jun. 19–22, 1983.

Primary Examiner—Howard W. Britton
Assistant Examiner—Bryan S. Tung
Attorney, Agent, or Firm—Sughrue, Mion, Zinn, Macpeak & Seas

[57] ABSTRACT

Derived from a picture input signal and a motion vector signal in a block matching type motion compensation encoding device, a prediction error signal is quantized by a controllable quantizer into a quantized signal for encoding together with the motion vector signal. Supplied with frame pulses, a controller produces a control signal with a predetermined value for making the quantizer quantize a zero signal instead of the error signal and with a different value for operating the quantizer merely as a forward quantizer. An amount of encoded information is reduced when the predetermined value appears once in two or three frame periods. For smoother movement of a movable part in reproduced pictures, the zero signal is not substituted in each duration in which motion vectors are either greater in magnitude, not identical with a representative vector, or less correlated with corresponding motion vectors in a previous picture for which the zero signal is not substituted. Each duration may be an interval of time during which the error signal has a greater absolute value. The controllable quantizer may be a combination of the forward quantizer and a selector controlled by the control signal to select the zero signal and either the error signal or an output signal of the forward quantizer.

28 Claims, 20 Drawing Sheets

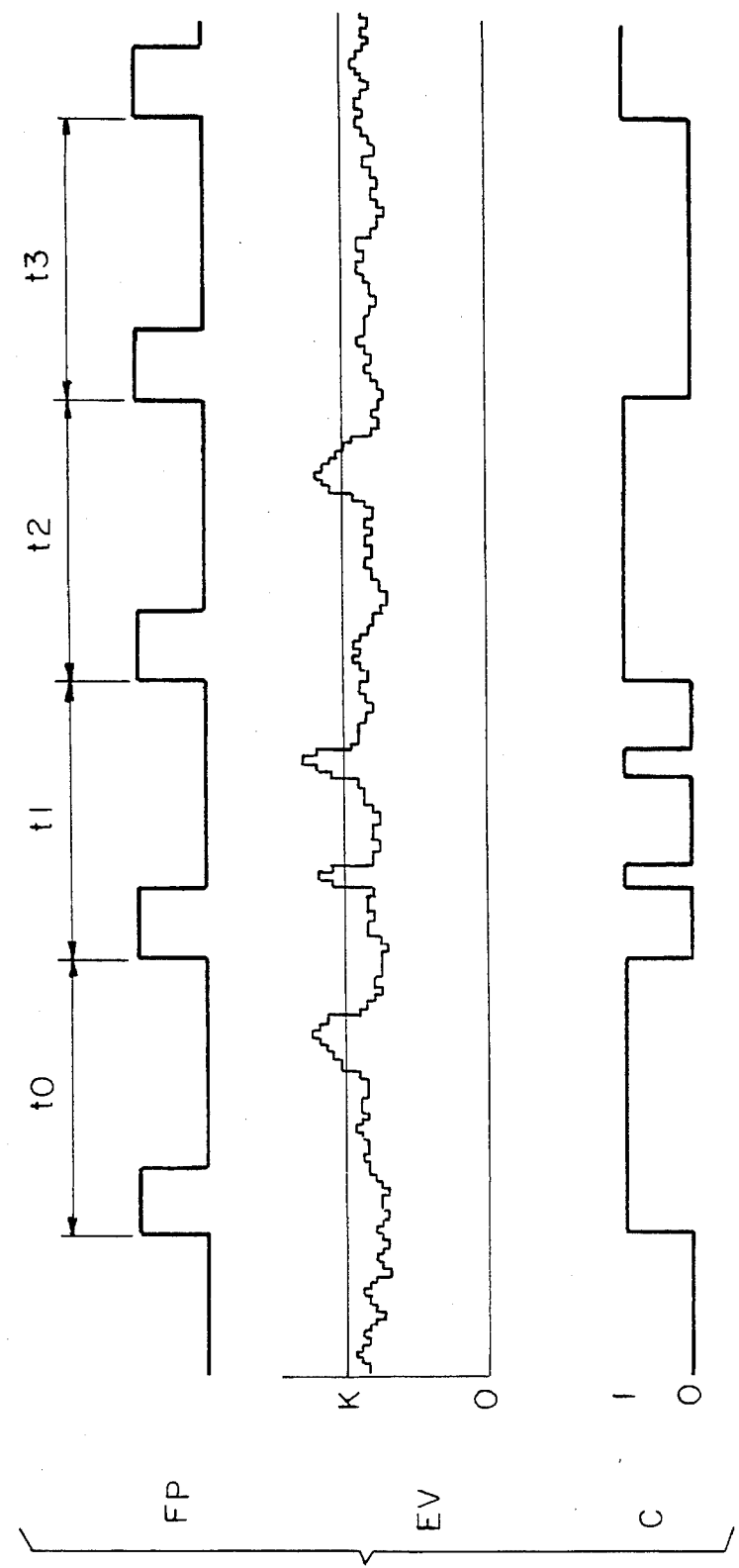

BLOCK MATCHING TYPE MOTION COMPENSATION ENCODER WITH CONTROLLABLE PREDICTIVE QUANTIZER

BACKGROUND OF THE INVENTION

This invention relates to a picture signal encoding device which is a block matching type motion compensation encoding device and which is for encoding a picture input signal into a picture output signal.

The input signal is typically a video signal of a television signal and represents a succession of pictures in successive periods which recur at a predetermined period, such as a frame period, so that each of the successive periods is equal to the predetermined period. The output signal represents the pictures with a predetermined bit rate. Each of the pictures has a movable part movable between a current picture represented by the input signal during a current period of the successive periods and a previous picture represented by the input signal during a previous period which is one predetermined period prior among the successive periods to the current period.

Although referred to as a part, the movable part may extend to a whole area of each picture. The movable part need not be different between two consecutive pictures. It is possible to divide or partition each picture into a plurality of blocks, each consisting of, for example, seven picture elements (pels) in each of seven consecutive horizontal lines.

A block matching type motion compensation encoding device is disclosed in Japanese Patent Prepublication (Kôkai) No. 158,784 of 1980 for an invention by Akira Hirano filed on May 28, 1979, in Japan under Patent Application No. 65,853 of 1979. Another block matching type motion compensation encoding device is described in the Japanese language in an article contributed by Toshio Koga and three others including the above-named Hirano and the present inventor under the title of "Kaigi Terebi Singô no Ugoki Hosyô Hurêmukan Hugôka (Motion-Compensated Interframe Coding for Video Conference)" to "Tûsin Hôsiki Kenkyûkai Siryô(Communication System Study Group Pamphlet)", Cs81-87, pages 85 to 90, published July. 22, 1981, by the Institute of Electronics and Communication Engineers of Japan. Still another block machining type motion compensation encoding device is described in a paper submitted by T. Koga and four others to IEEE International Conference on Communications, Jun. 19–22, 1983, under the title of "A 1.5 Mb/s Interframe Codec with Motion Compensation" (numbered 83CH1874.7/83/0000.1161). The encoding devices of the Koga et al article and paper are substantially identical insofar as the instant invention is concerned. Each will be called a Koga et al encoding device.

In the manner which will later become clear, the Koga et al encoding device comprises a vector detector. Supplied with the picture input signal, the vector detector detects displacements as motion vectors in the movable part. Detecting the motion vectors, the vector detector produces a motion vector signal representative of the motion vectors.

Supplied with the picture input signal and a subtracter input signal which will presently be described, a subtracter calculates a signal difference between the picture input signal and the subtracter input signal to produce a difference signal representative of the difference. A forward quantizer quantizes the difference signal into a quantized signal. A backward quantizer dequantizes the quantized signal into a dequantized signal. An encoder encodes the motion vector signal and the quantized signal into the picture output signal.

Supplied with the dequantized signal and an adder input signal which will shortly be described, an adder produces a sum signal representative of a signal sum of the dequantized signal and the adder input signal. A motion compensation predictor subjects the motion vector signal and the sum signal on a block-by-block basis to block match between the current and the previous pictures. Carrying out the block match, the motion compensation predictor predicts the picture input signal with motion compensation and with error minimization to produce a predicted input signal which is referred to as an optimum prediction signal in the Koga et al paper and is used as the adder input signal. The sum signal serves as a local decoded signal into which the dequantized signal is decoded.

As a consequence, a combination of the adder and the motion compensation predictor serves as a decoding and motion compensating circuit for subjecting the motion vector signal and the dequantized signal to the block match to produce the predicted input signal. A predicted signal supply connection supplies the predicted input signal to the subtracter as the subtracter input signal. The subtracter therefore produces the difference signal as a prediction error signal representative of the difference as a prediction error.

It is now understood that a whole combination of the subtracter, the forward and the backward quantizers, the decoding and motion compensating circuit, and the predicted signal supply connection serves as a predictive quantizing arrangement for producing the predicted input signal with the motion vector signal used to carry out the block match with the motion compensation and with the error minimization in producing the prediction error signal representative of the signal difference between the picture input signal and the predictive input signal. Furthermore, the predictive quantizing arrangement quantizes the prediction error signal into the quantized signal.

More briefly, the predictive quantizing arrangement derives the prediction error signal from the picture input signal and the motion vector signal and quantizes the prediction error signal into the quantized signal.

With a compact size of about 48×45×45 cm, the Koga et al encoding device is excellently operable when the predetermined bit rate is 1,544 Mb/s. A considerable amount of encoded information, however, still remains in the picture output signal.

As a result, it is difficult with the Koga et al encoding device to select a slower bit rate of, for instance 64 bit/s, as the predetermined bit rate even when the picture output signal is subsampled. Furthermore, the picture output signal must use an appreciably large amount of the encoded information when the movable part has a wide area. In such an event, the forward quantizer must quantize the error signal with a coarse quantization step. Alternatively, encoding of the picture input signal must intermittently be suspended. This gives an objectionable picture quality to pictures reproduced from the picture output signal. Inasmuch as such a slow bit rate is a problem to be solved by this invention, the slower bit rate will herein be referred to afresh as the predetermined bit rate.

SUMMARY OF THE INVENTION

It is consequently an object of the present invention to provide a picture signal encoding device which is a block matching type motion compensation encoding device and is capable of encoding a picture input signal into a picture output signal representative of a small amount of encoded information.

It is another object of this invention to provide a picture signal encoding device which is of the type described and which encodes the picture input signal into the picture output signal of a predetermined bit rate.

Other objects of this invention will become clear as the description proceeds.

On setting forth the gist of this invention, it is possible to understand that a picture signal encoding device is operable as a block matching type motion compensation encoding device including an encoder for encoding into a picture output signal a quantized signal in addition to a motion vector signal representative of a displacement of a movable part between two of a plurality of pictures which are represented by a picture input signal in successive periods recurring at a predetermined period.

According to this invention, the above-understood picture signal encoding device comprises: (A) controllable predictive quantizing means for controllably quantizing into the quantized signal a prediction error signal derived from the picture input signal and the motion vector signal; (B) a controller for producing a control signal indicative of a predetermined value substantially in each of preselected periods of the successive periods; and (C) control signal supply means for supplying the control signal to the controllable predictive quantizing means to make the controllable predictive quantizing means produce the quantized signal by substituting a zero signal for the error signal when the control signal indicates the predetermined value.

In the above-described gist of this invention, each of the preselected periods may appear once in an integral multiple of the predetermined period. Preferably, the zero signal should not be substituted for the prediction error signal in each duration in which the motion vector signal of each of the preselected periods represents the motion vectors having magnitudes which are equal to or greater than a preselected threshold value. It is possible to use as the duration an interval of time during which the prediction error signal has an error absolute value which is equal to or greater than a preselected threshold value. Alternatively, the duration may be an interval of time during which the motion vectors are not identical with a representative vector which is used in place of most of the motion vectors that have a common direction with sense. As a further alternative, each duration may be an interval of time during which current vectors of the motion vectors of the current picture have a correlation value relative to previous vectors corresponding to the current vectors in the motion vectors of the previous picture when the zero signal is substituted for the prediction error signal produced in connection with the current picture and furthermore when the correlation value is less than a preselected threshold value.

BRIEF DESCRIPTION OF THE DRAWINGS

FIG. 28 is a time chart for use in describing operation of a controller which is for use in the picture signal encoding device depicted in FIG. 26.

DESCRIPTION OF THE PREFERRED EMBODIMENTS

Figure 1:
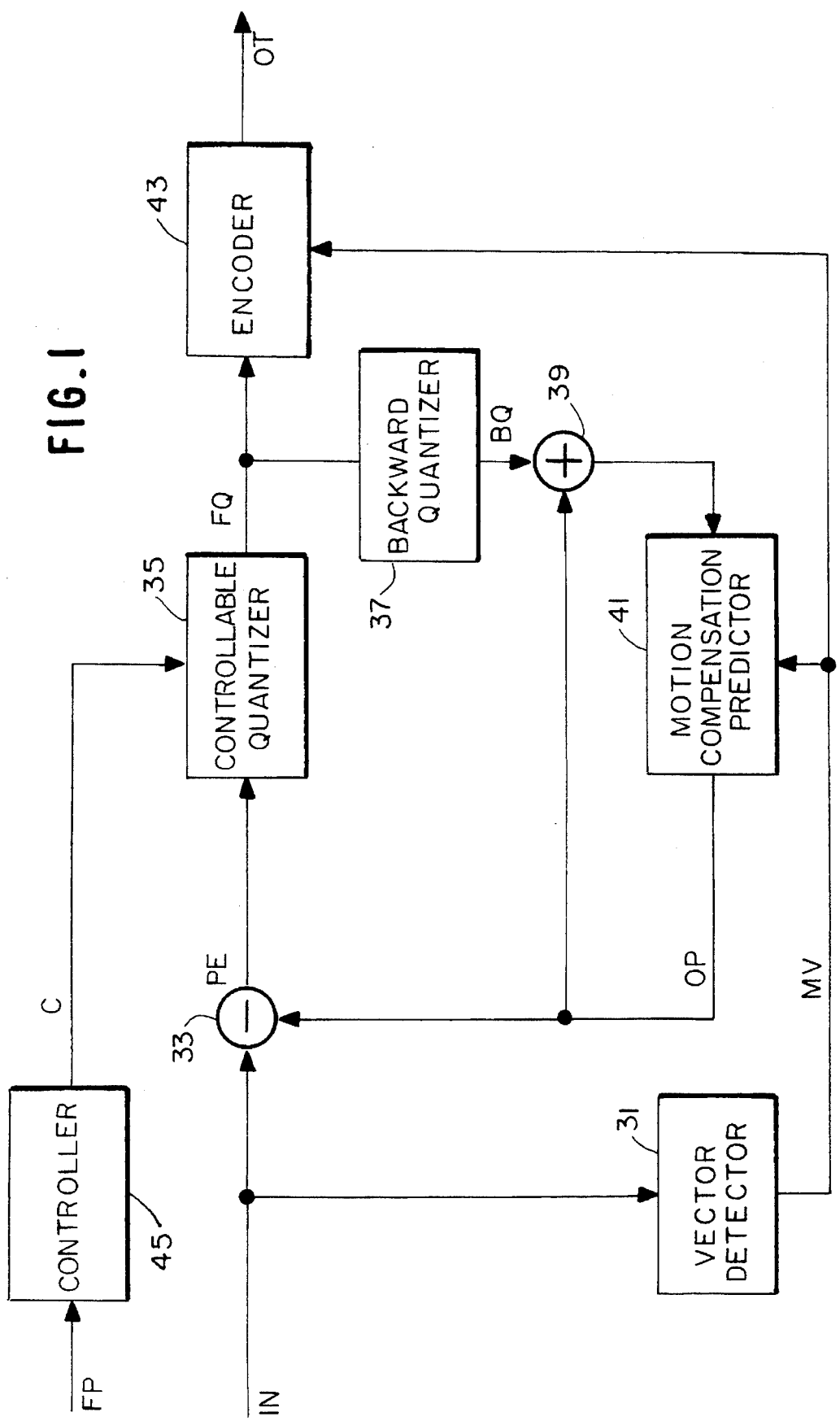
FIG. 1 is a block diagram of a picture signal encoding device according to a first embodiment of the instant invention.

Referring to FIG. 1, the description will begin with a picture signal encoding device according to a first embodiment of the present invention. The picture signal encoding device is a block matching type motion compensation encoding device of the type described heretobefore in connection with the Koga et al article and paper and is for encoding a picture input signal into a picture output signal.

In the manner described hereinabove, the input signal represents a succession of pictures in successive periods which recur at a predetermined period, such as a frame period of a television signal, so that each of the successive periods is equal to the predetermined period. The output signal represents the pictures with a predetermined bit rate.

It will be assumed that the picture input signal is a video signal of a television signal. Each of the pictures has a movable part movable between a current picture represented by the input signal during a current frame F of the successive frames and a previous picture represented by the input signal during a previous frame F' which is one frame period prior among the successive frames to the current frame.

Although referred to as a part, the movable part may be a whole area of each picture. The movable part need not be different between two consecutive pictures. It is possible to divide or partition each picture into a plurality of blocks, each consisting of, for example, seven picture elements (pels) in each of seven consecutive horizontal lines.

In FIG. 1, the picture signal is indicated by IN and is supplied to a vector detector 31. In the manner known in the art, the vector detector 31 detects motion vectors or displacements in each picture and produces a motion vector signal MV representative of the motion vectors. The vector detector 31 produces the motion vector signal by subjecting the picture input signal to block match in the manner described below. Alternatively, the vector detector 31 may detect the motion vectors with reference to each pair of picture elements which correspond in the current and the previous pictures with the displacement taken into consideration.

Figure 2:
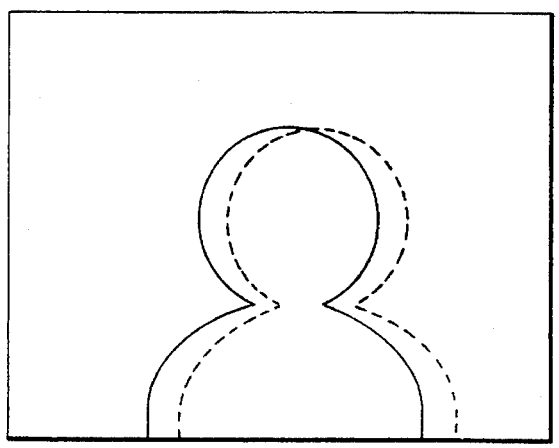
FIG. 2 exemplifies a movable part in two consecutive pictures.

Turning to FIG. 2 during a short while, the current picture shows an upper body of a man as outlined by a dashed line. It will be surmised that the upper body was represented in the previous picture as shown by a solid-line outline. The upper body is the above-mentioned movable part.

Figure 3:
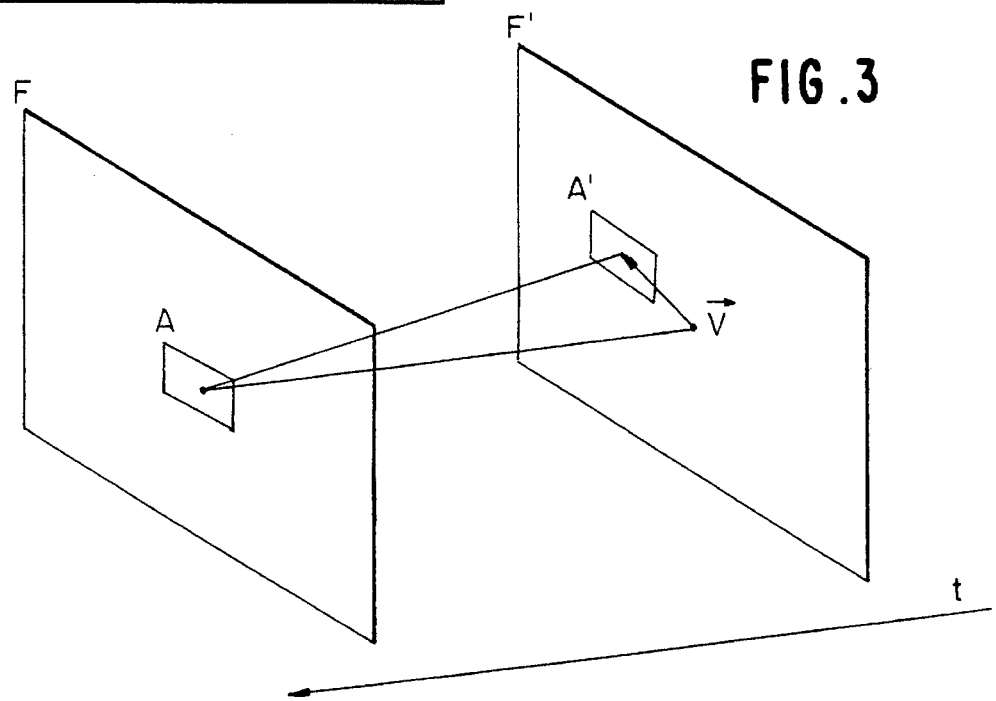
FIG. 3 is a diagram for use in describing a motion vector.

Further turning to FIG. 3, the current frame or picture is depicted at F and the previous frame or picture, at F', along a time axis t. One of the above-mentioned blocks is shown as a current block A in the current frame by a small rectangle. It will be presumed that this part of the current picture was present in the previous picture as a previous part A'. A current point is taken into consideration in the current block of the current picture. Another point corresponds in position to the current point as a corresponding point in the previous picture. It will be presumed that the current point has moved from a previous point in the previous part. A displacement between the previous and the current points represents a motion vector V of the current point or of the current block.

It is known in the art to find on a block-by-block basis a previous block that has moved to the current block. For this purpose, the previous picture is stored block by block in a frame memory (not shown) as stored blocks. The current block is selected in the current picture. The previous block is given by one of the stored blocks that has a highest correlation to the current block. The correlation is calculated by a total sum of either squares of differences between corresponding picture elements in the current block and in each of the stored blocks or of absolute values of the differences.

Figure 4:
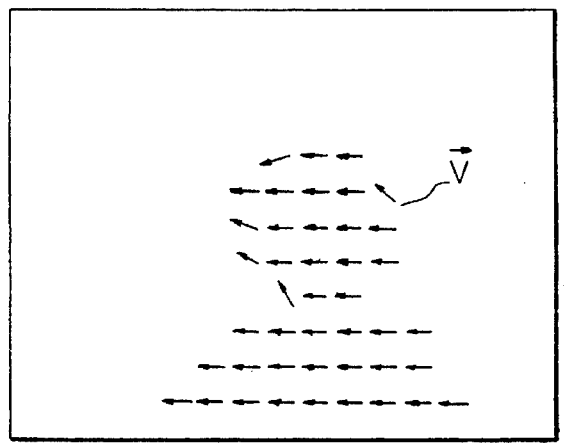
FIG. 4 shows motion vectors representative of displacements of the movable parts exemplified in FIG. 2.

Still further turning to FIG. 4, the motion vectors are exemplified, one in connection with each block. In the example being illustrated, most of the motion vectors have a common magnitude and a common direction with sense.

Turning back to FIG. 1, a subtracter 33 is supplied with the picture input signal IN and a subtracter input signal OP which will presently be described. The subtracter 33 produces a difference signal PE which represents a signal difference between the picture input signal and the subtracter input signal and will shortly become clear.

A forward quantizer 35 is a controllable quantizer in FIG. 1. As will become clear as the description proceeds, the controllable quantizer 35 controllably quantizes the difference signal into a quantized signal FQ with a forward quantizing characteristic which is given preferably by nonlinear step sizes. A backward quantizer 37 dequantizes the quantized signal into a dequantized signal BQ with a backward quantizing characteristic which is complementary to the forward quantizing characteristic. Supplied with the dequantized signal and an adder input signal which will soon be described, an adder 39 produces a sum signal which represents a signal sum of the dequantized and the adder input signals and is a local decoded signal into which the dequantized signal is decoded.

A motion compensation predictor 41 is discussed in detail in the afore-referenced Koga et al article and paper as a single variable delay circuit and a combination of a frame memory and a variable delay circuit. A little more in detail, the motion compensation predictor 41 subjects the motion vector signal MV on the block-by-block basis to block match between the current and the previous pictures. Carrying out the block match, the motion compensation predictor 41 predicts the picture input signal from the sum signal with motion compensation and with error minimization to produce a predicted input signal OP, which is referred to as an optimum prediction signal in the Koga et al paper. Together with the vector detector 31, the motion compensation predictor 41 is described more in detail in the above-cited Japanese Patent Prepublication.

A connection between the adder 39 and the motion compensation predictor 41 supplies the predicted input signal to the adder 39 as the adder input signal. Another connection between the subtracter 33 and the motion compensation predictor 41 serves as a predicted signal supply arrangement for supplying the predicted input signal to the subtracter 33 as the subtracter input signal. The subtracter 33 therefore produces as the difference signal a prediction error signal PE representative of a prediction error.

A combination of the adder 39 and the motion compensation predictor 41 serves as a decoding and motion compensating circuit for subjecting the motion vector signal to the block match. Carrying out the block match, the decoding and motion compensating circuit uses the dequantized signal in producing the decoded signal for use therein and the predicted input signal for use by the subtracter 33 as the subtracter input signal.

A whole combination of the subtracter 33, the controllable and the backward quantizers 35 and 37, the decoding and motion compensating circuit (39, 41), and the predicted signal supply arrangement serves as a controllable predictive quantizing arrangement for controllably quantizing the predicted input signal into the quantized signal. It should be noted in this connection that the predictive quantizing arrangement (33, 35, 37, 39, 41) derives the prediction error signal from the picture input signal and the motion vector signal on controllably quantizing the motion vector signal into the quantized signal.

An encoder 43 is preferably a variable length encoder for encoding the motion vector signal and the quantized signal into a picture output signal OT representative of the pictures with a predetermined bit rate which is considerably lower than that attained by a conventional picture encoding device and is as low as 64 kb/s. More particularly, the encoder 43 encodes the motion vector signal into vector representing codes and the quantized signal into error representing codes to produce the vector and the error representing codes collectively as the picture output signal. Huffman codes are preferably used as the vector and the error representing codes. The low bit rate is achieved in the manner described in the following.

Supplied with frame pulses FP indicative of partitions of the frame periods in the video signal, a controller 45 produces a control signal C indicative of a predetermined value in each of preselected periods of the successive periods. In FIG. 1, each preselected period appears in an integral multiple of the predetermined period. In other words, the control signal is given the predetermined value once in the integral multiple of the frame period, such as two or three frame periods.

A connection between the controllable quantizer 35 and the controller 45 serves as a control signal supply arrangement for supplying the control signal to the controllable quantizer 35. Controlled by the control signal C, the controllable predictive quantizing arrangement quantizes the picture input signal IN into the quantized signal FQ with a zero signal substituted for the prediction error signal PE whenever the control signal indicates the predetermined value. The controllable quantizer 35 quantizes the zero signal into a zero representing code. As a consequence, the encoder 43 produces the vector and the zero representing codes collectively as the picture output signal when the control signal indicates the predetermined value. When the encoder 43 is a run length encoder, the zero representing codes are encoded into run length codes.

It is therefore possible to implement the controllable quantizer 35 by a quantizer read-only memory which may be accessed by an address signal composed of a most significant bits and less significant bit. The control signal C is used as the most significant bit with a binary zero value used as the predetermined value and with a binary one value used as a different value of the control signal. The less significant bits are representative of the prediction error represented by the prediction error signal PE. A zero value is preliminarily stored in memory addresses which are accessed when the address signal indicates the binary zero value as the most significant bit. Quantized values are preliminarily stored in remaining addresses accessed by the less significant bits of the address signal.

Figure 5:
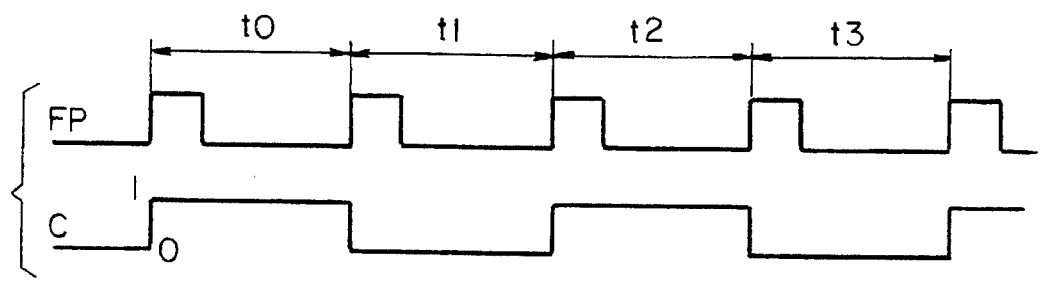
FIG. 5 is a time chart for use in describing operation of the picture signal encoding device illustrated in FIG. 1.

Referring to FIG. 5, zeroth through third frame pulses are depicted along an upper row labelled FP. These frame pulses define zeroth through third frame periods t0, t1, t2, and t3. It will be assumed that the integral multiple is equal to two. In this event, the control signal indicates the binary zero value as the predetermined value during the first and the third frame periods and the binary one value as the different value in other frame periods.

Figure 6:
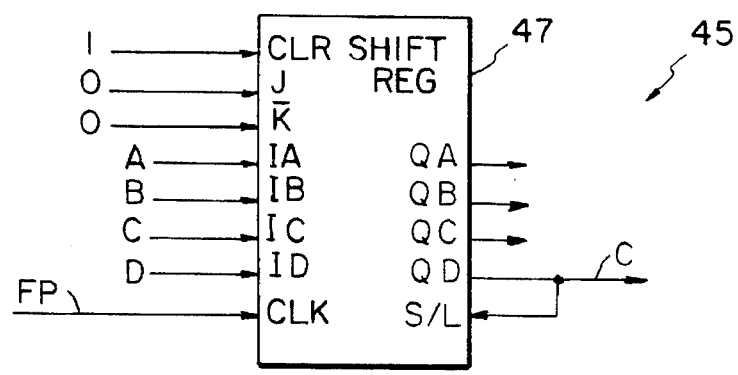
FIG. 6 is a block diagram of a controller for use in the picture signal encoding device depicted in FIG. 1.

Turning to FIG. 6, the controller 45 is implemented by a shift register 47 which is, for example, a parallel access shift register SN74LS195 manufactured and sold by Texas Instruments and is stepped by build-up edges of the frame pulses FP which are supplied to a clock terminal CLK for use as clock pulses. First through fourth input signals A, B, C, and D are supplied in parallel to first through fourth signal input terminals IA, IB, IC, and ID. First and second binary zero signals are supplied to true and inverse input terminals J and/K. A binary one signal is supplied to a clear terminal CLR. A shift/load signal is supplied to a shift/load terminal S/L. The shift register 47 has first through fourth signal output terminals QA, QB, QC, and QD and produces a shift register output signal from the fourth signal output terminal QD to supply the register output signal to the shift/load terminal as the shift/load signal.

When the shift-load signal indicates the binary zero value and the binary one value, the shift register 47 is operable in a parallel access mode and in a serial shift mode of operation. If the integral multiple is equal to two, each of the first through the third input signals A to C is given the binary zero value and the fourth input signal D, the binary one value. In the parallel access mode, the shift register 47 is loaded with the first through the fourth input signals at each build-up edge of the frame pulses and produces the first through the fourth input signals at the first through the fourth signal output terminals as they are. The shift register 47 is therefore put in the serial shift mode of shifting the first binary zero signal and an inversion of a signal supplied through the inverse input terminal to the first signal output terminals and the first through the third input signals to the second through the fourth signal output terminals. The shift register 47 is consequently put back into the parallel access mode at the build-up edge that next follows the build-up edge under consideration.

Figure 7:
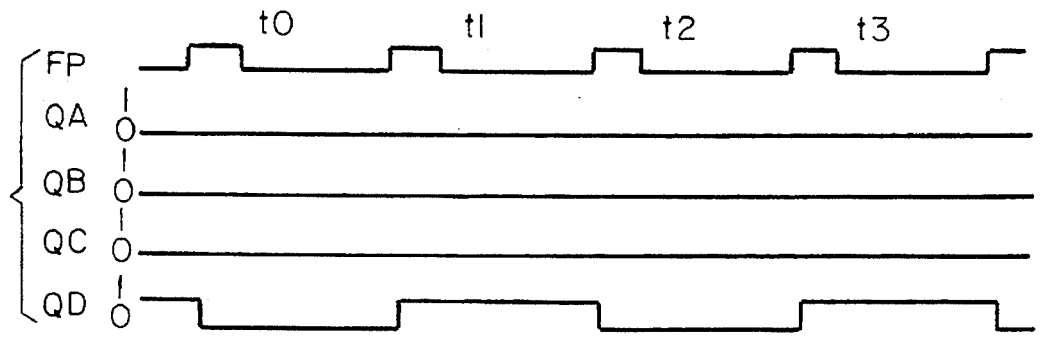
FIG. 7 is a time chart for use in describing operation of the controller illustrated in FIG. 6.

Further turning to FIG. 7 with reference to FIG. 6 continued, the frame pulses are illustrated along a first or top row labelled FP. The shift register 47 produces first through fourth output signals at the first through the fourth signal output terminals QA to QD in the manner depicted along second through fifth or bottom rows labelled QA, QB, QC, and QD. The fourth output signal is the shift register output signal and is used as the control signal C in the picture signal encoding device illustrated with reference to FIG. 1.

Figure 8:
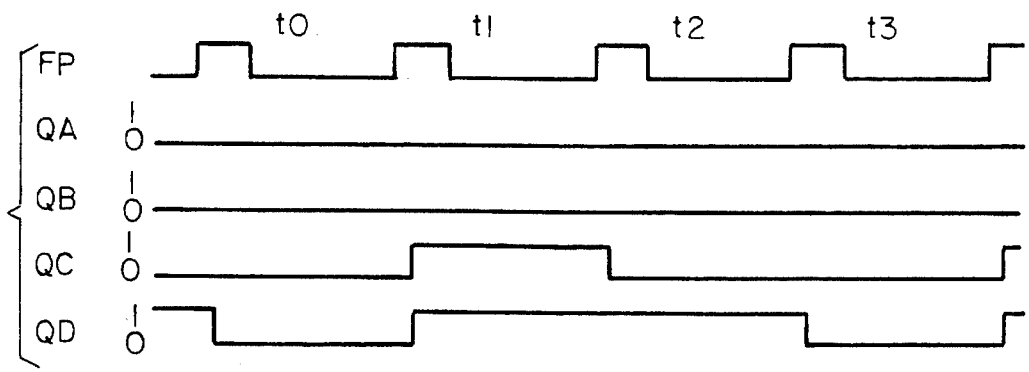
FIG. 8 is another time chart for use in describing operation of the controller shown in FIG. 6.

Referring to FIG. 8 with FIG. 6 again referred to, it will now be assumed that the integral multiple is equal to three. In this event, each of the first and the second input signals is given the binary zero value and each of the third and the fourth input signals, the binary one value. The frame pulses are illustrated along a first or top row labelled FP. The first through the fourth output signals are depicted along second through fifth rows labelled QA through QD. The shift register 47 is put into the serial shift mode at the build-up edge of the zeroth frame pulse, into the parallel access mode at the build-up edge of the first frame pulse, into the serial shift mode at the build-up edge of each of the second and the third frame pulses, and in the parallel access mode at the build-up edge of a next frame pulse.

It is now understood with reference to FIGS. 6 through 8 that the integral multiple can be given a desired value by varying the first through the fourth input signals to which the binary one value is given and by adding fifth or other input signals if necessary. In any event, the greatest numbered output signal is used as the control signal in the picture signal encoding device of FIG. 1. The integral multiple should, however, be as small as possible in order to reduce an amount of encoded information which is carried by the picture output signal.

Summarizing, the parallel access shift register 47 is supplied with the frame pulses FP and with the first through the fourth input signals A to D as a plurality of register input signals which are collectively indicative of the integral multiple. Supplied with the frame pulses as clock pulses and with the register input signals, the shift register 47 produces the control signal C indicative of the binary zero value as the predetermined value and the binary one value as the different value other than or different from the predetermined value, one at a time.

Figure 9:
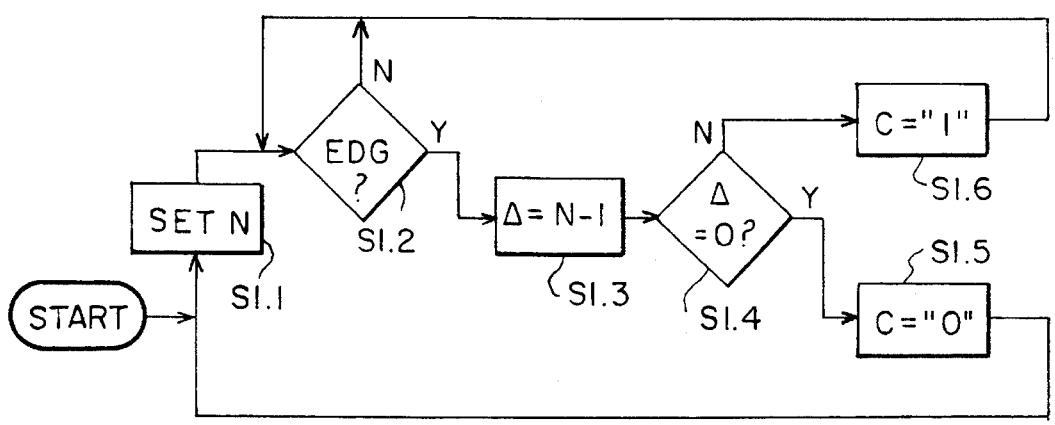
FIG. 9 is a flow chart for use in describing a controller which is for use in the picture signal encoding device depicted in FIG. 1.

Referring to FIG. 9 in addition to FIG. 1 and FIG. 6 or 8, the controller 45 is alternatively implemented by a processor, such as a microprocessor, programmed as follows. At a first step S1.1, the integral multiple is set as an initial condition in the processor as indicated by "set N", where N represents the integral multiple. At a second step S1.2, the processor repeatedly detects the build-up edge (EDG) of each of the frame pulses FP supplied thereto. At a third step S1.3, the processor calculates an integer difference Δ which is equal to the integral multiple minus one. At a fourth step S1.4, the processor checks whether or not the difference is equal to zero. If the difference is equal to zero, the processor produces at a first step S1.5 a processor output signal as the control signal with the binary zero value, namely, with the predetermined value. If the difference is not equal to zero, the processor produces the processor output signal at a sixth step S1.6 with the binary one value. The fifth and the sixth step return to the first step Si.1 in preparation for production of the control signal with regard to the pictures of another sequence of the successive periods. The build-up edge is a leading edge when called more in general.

Figure 10:
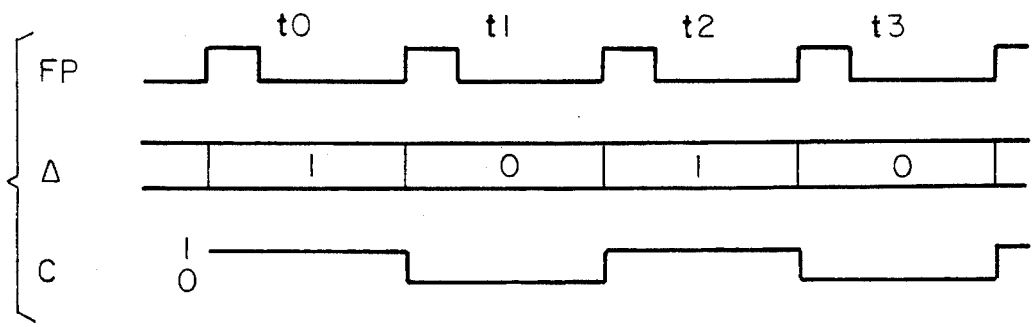
FIG. 10 is a time chart for use in describing operation of the controller operable in accordance with the flow chart shown in FIG. 9.

Turning to FIG. 10 with FIGS. 1 and 9 additionally referred to, it is again assumed that the integral multiple is equal to two and that the initial condition is set in the controller 45 prior to the zeroth frame pulse of the frame pulses illustrated along a first or top row labelled FP. The integer difference is shown along a second or middle row labelled Δ. The control signal is depicted along a third or bottom row labelled C.

When FIG. 10 is compared with FIG. 8, the control signal C has an opposite polarity. This, however, introduces no problem.

Figure 11:
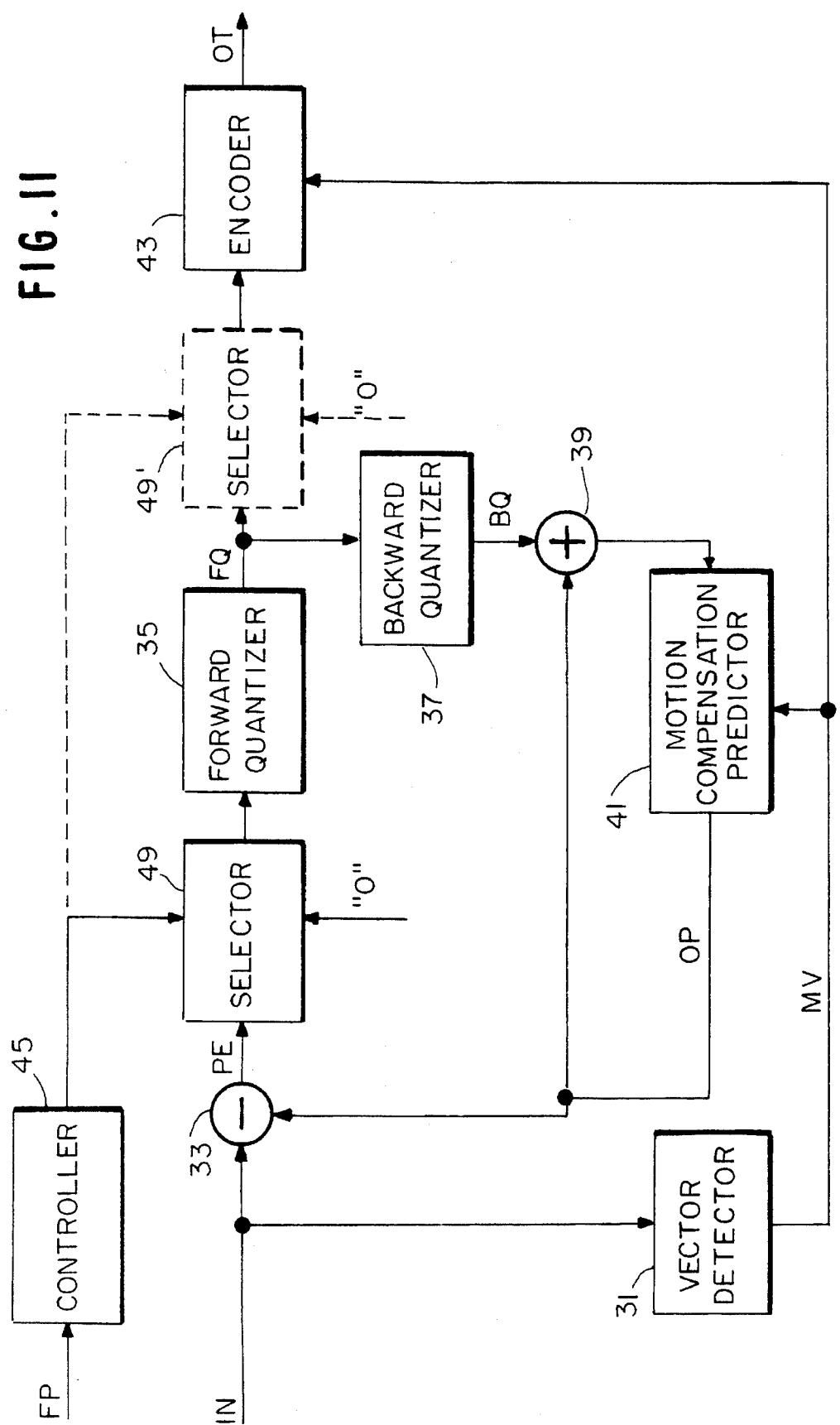
FIG. 11 is a block diagram of a picture signal encoding device according to a modification of the picture signal encoding device depicted in FIG. 1.

Referring to FIG. 11, the description will proceed to a picture signal encoding device according to a modification of the device illustrated with reference to FIG. 1. Similar parts are designated by like reference numerals and are similarly operable with likewise named signals which are indicated by like reference symbols.

The controllable predictive quantizing arrangement comprises a selector 49 between the subtracter 33 and the forward quantizer 35 which is not controllable in the example being illustrated. Supplied with the control signal C, the selector 49 selects a zero signal "0" and the prediction error signal PE as a selected signal for supply to the forward quantizer 35 when the control signal indicates the predetermined value and otherwise, respectively. The forward quantizer 35 quantizes the selected signal into the quantized signal FQ.

It is alternatively possible to place a selector 49' on an output side of the forward quantizer 35 in the manner illustrated by a dashed-line block. The forward quantizer 35 will be said to produce a quantizer output signal. Controlled by the control signal C, the selector 49' selects the zero signal "0" and the quantizer output signal as the quantized signal FQ when the control signal indicates the predetermined value and otherwise.

Reviewing FIGS. 1 through 11, it has been found by the inventor that the picture output signal OT represents the pictures with an objectionable quality when the zero signal is substituted for the prediction error signal PE derived from the motion vector signal MV representative of rotation of the movable part. This is the case when the movable part is subjected to the displacement of a great magnitude.

Figure 12:
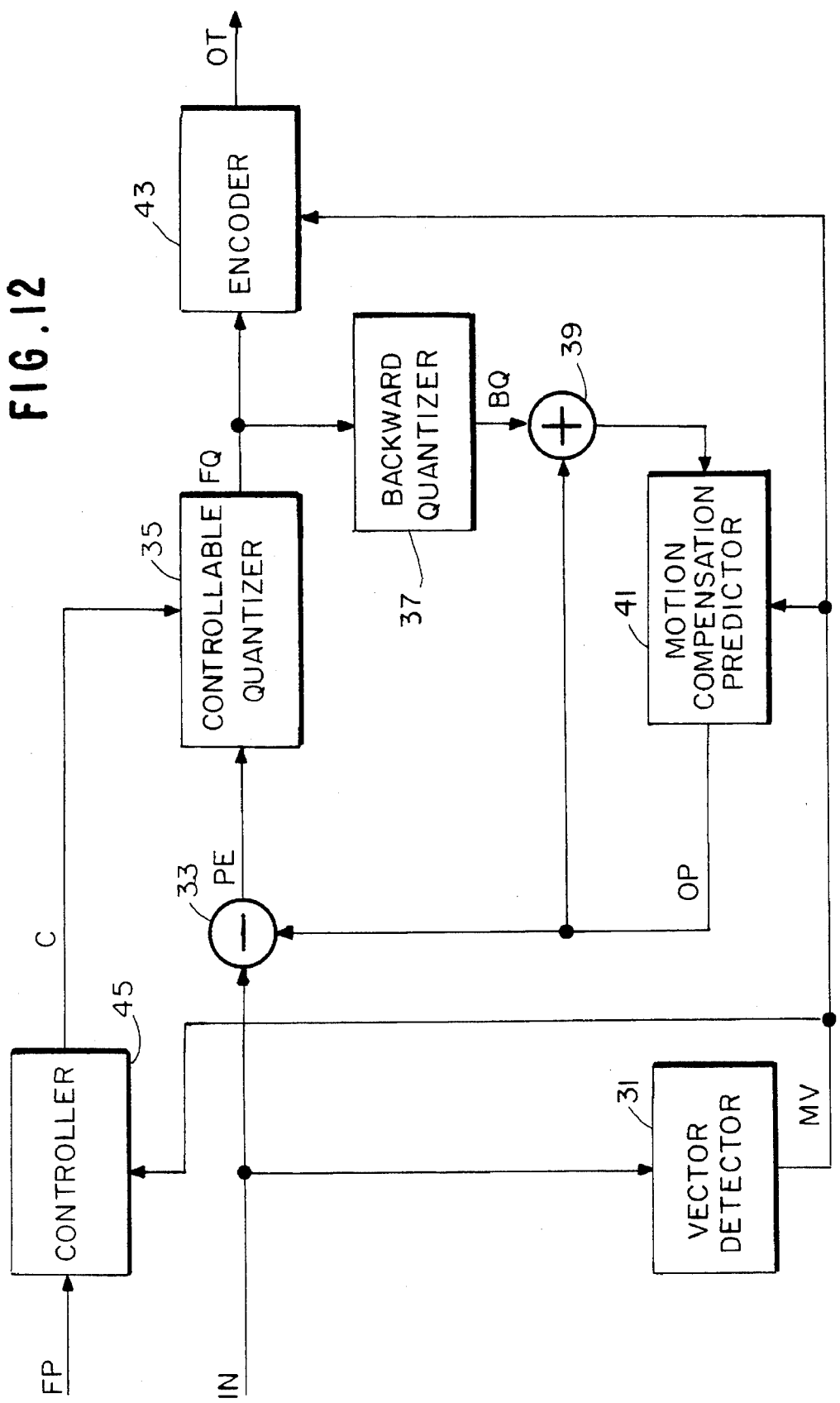
FIG. 12 is a block diagram of a picture signal encoding device according to a second embodiment of this invention.

Referring now to FIG. 12, attention will be directed to a picture signal encoding device according to a second embodiment of this invention. Similar parts are designated by like reference numerals and are similarly operable with likewise named signals which are designated by like reference symbols. The motion vector signal MV is used in controlling the controller 45.

Figure 13:
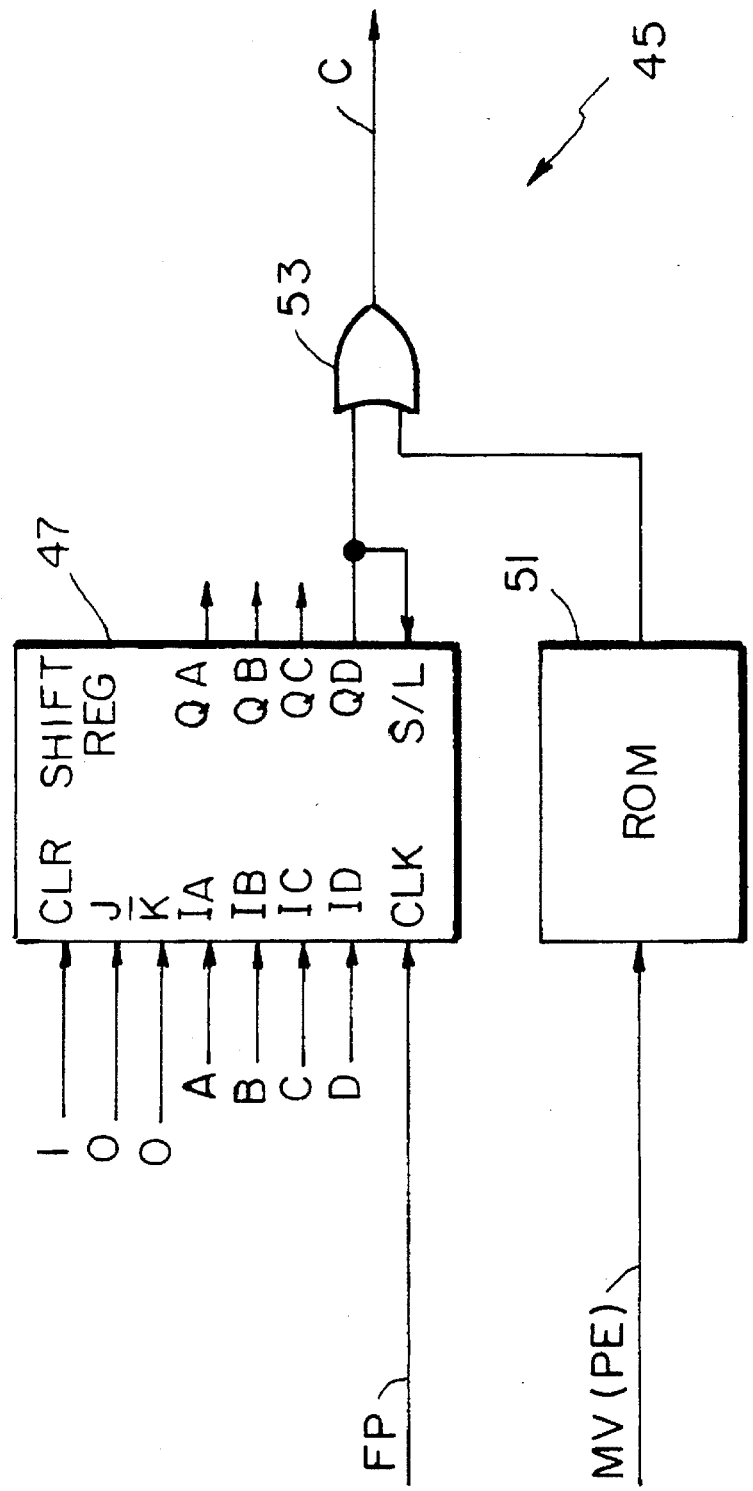
FIG. 13 is a block diagram of a controller for use in the picture signal encoding device depicted in FIG. 12.

Referring to FIG. 13 with FIG. 12 continuously referred to, the controller 45 comprises either the shift register 47 illustrated with reference to FIG. 6 or the processor described with reference to FIG. 9. It should be understood that the processor is depicted as the shift register 47 in FIG. 13. Either the shift register output signal or the processor output signal will now be called a controller internal signal.

A controller read-only memory (ROM) 51 is supplied with the motion vector signal MV as an address signal to produce a memory output signal. Supplied with the controller internal signal and the memory output signal, an OR gate 53 produces the control signal C. A preselected threshold value K is preselected in connection with magnitudes of the motion vectors represented by the motion vector signal. The threshold value is readily empirically preselected in view of the pictures reproduced from the picture output signal OT.

When the magnitudes of the motion vectors are either equal to or greater than the threshold value, the memory output signal is given the binary one value. Otherwise, the memory output signal is given the binary zero value. It is therefore possible to preliminarily load the read-only memory 51 with signals representative of the binary one and zero values in memory addresses accessed by the motion vector signal representative of the motion vectors of the magnitudes which are not and are less than the threshold value.

It should be noted in this connection that the motion vectors are represented by the motion vector signal in connection with the picture elements in the current frame. As a consequence, it is understood that the control signal C indicates the binary zero value as the predetermined value when the current frame is one of the preselected frames of the successive frames and furthermore when the motion vector signal MV of the current frame represents, either for the blocks or the picture elements, the motion vectors having magnitudes which do not exceed the threshold value K. Otherwise, the control signal indicates the binary one value.

In this manner, the afore-described preselected periods are preselected in accordance with a combination of the frame pulses FP or the successive periods and the motion vector signal. More in detail, the afore-mentioned each of the preselected periods appears once in the integral multiple of the frame or predetermined period. The zero signal is, however, not substituted for the prediction error signal PE in each duration in which the motion vector signal MV of each of the preselected periods represents the motion vectors having the magnitudes which is either equal to or greater than the preselected threshold value K.

Figure 14:
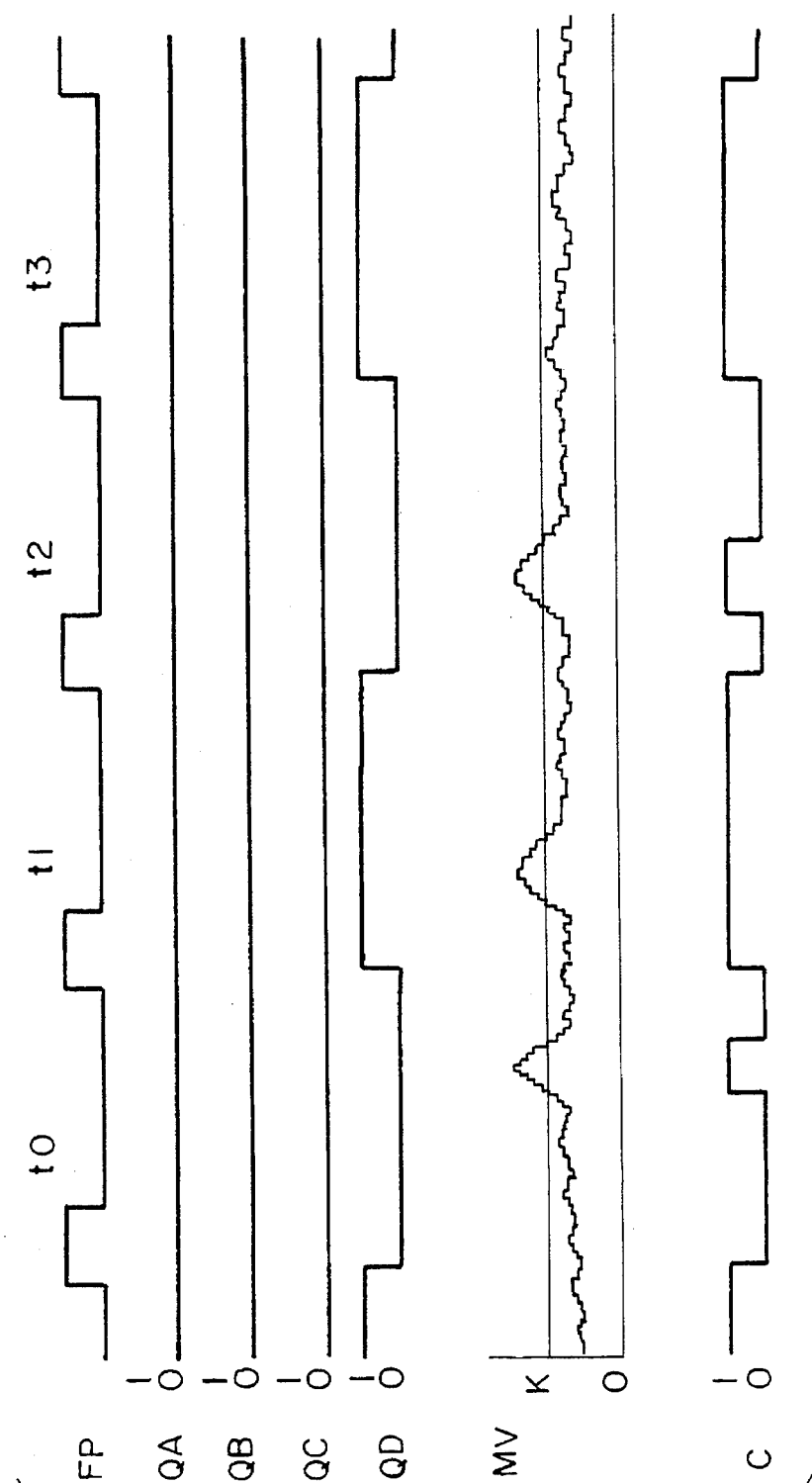
FIG. 14 is a time chart for use in describing operation of the controller illustrated in FIG. 13.

Turning to FIG. 14 with FIG. 13 continually referred to, it will again be assumed that the integral multiple is equal to two. The frame pulses are illustrated along a first or top row labelled FP. The first through the fourth output signals of the shift register 47 are depicted along second through fifth rows labelled QA to QD. The motion vector signal is exemplified by a stepped curve along a sixth row labelled MV with the preselected threshold value K indicated by a horizontal line which intersects with the stepped curve. In connection with the motion vector signal exemplified along the sixth row, the control signal indicates the binary zero and one values in the manner shown along a seventh or bottom row labelled C. It should be noted that the control signal indicates the binary one value even in each of the preselected periods when the motion vector signal represents the motion vectors having magnitudes which are either equal to or greater than the threshold value K.

Figure 15:
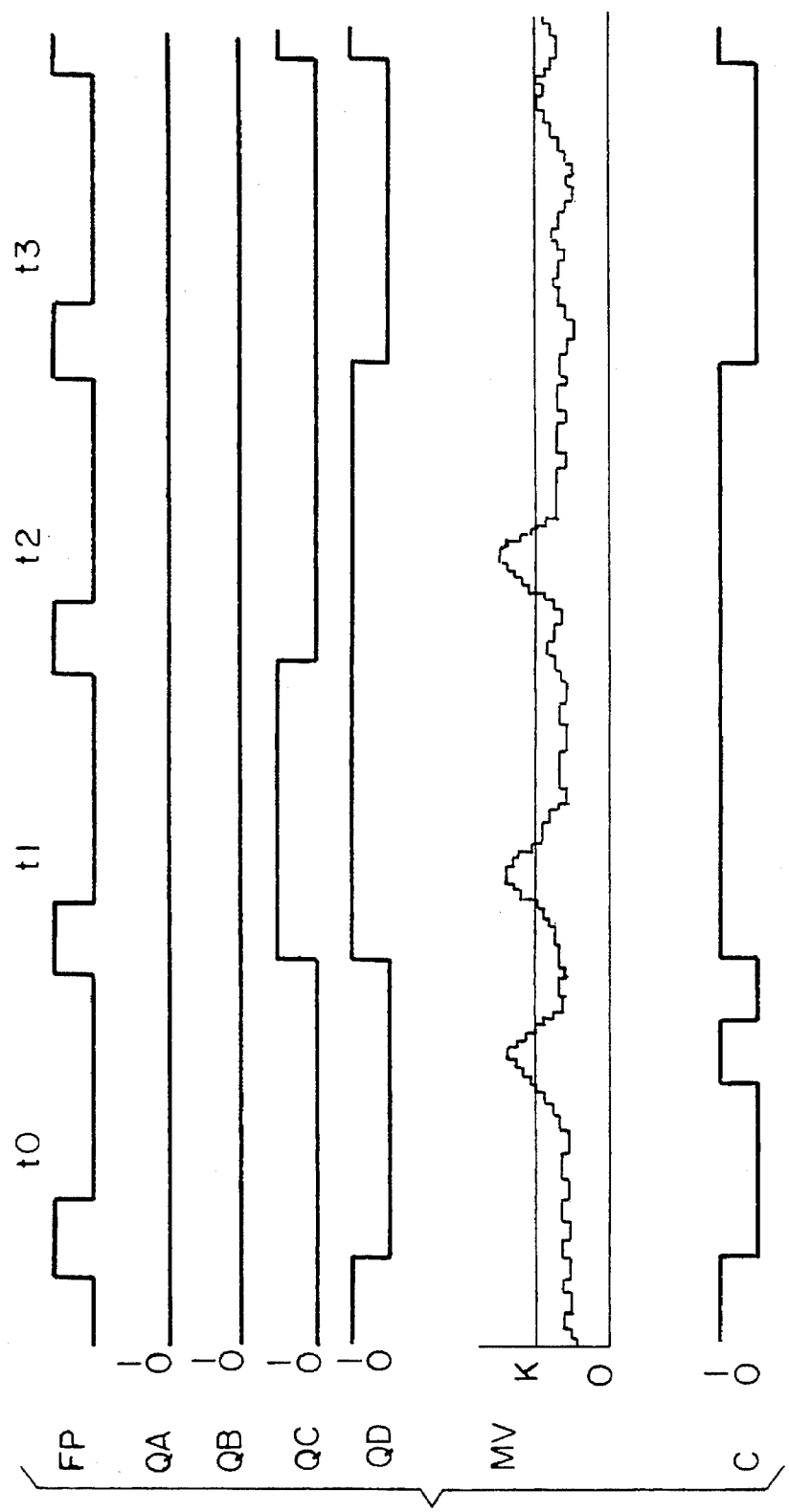
FIG. 15 is another time chart for use in describing operation of the controller shown in FIG. 13.

Further turning to FIG. 15 with reference to FIG. 13 continued, it is assumed that the integral multiple is equal to three. The frame pulses are illustrated along a first or top row labelled FP. The first through the fourth output signals of the shift register 47 are depicted along second through fifth rows labelled QA to QD. The motion vector signal is exemplified by a stepped curve along a sixth row labelled MV with the preselected threshold value K indicated by a horizontal line which crosses the stepped curve. In this event, the control signal indicates the binary zero and one values in the manner shown along a seventh or bottom line labelled C. It is understood that the control signal indicates the binary one value in each of the preselected periods when the motion vector signal represents the motion vectors having magnitudes which are either equal to or greater than the threshold value K.

Figure 16:
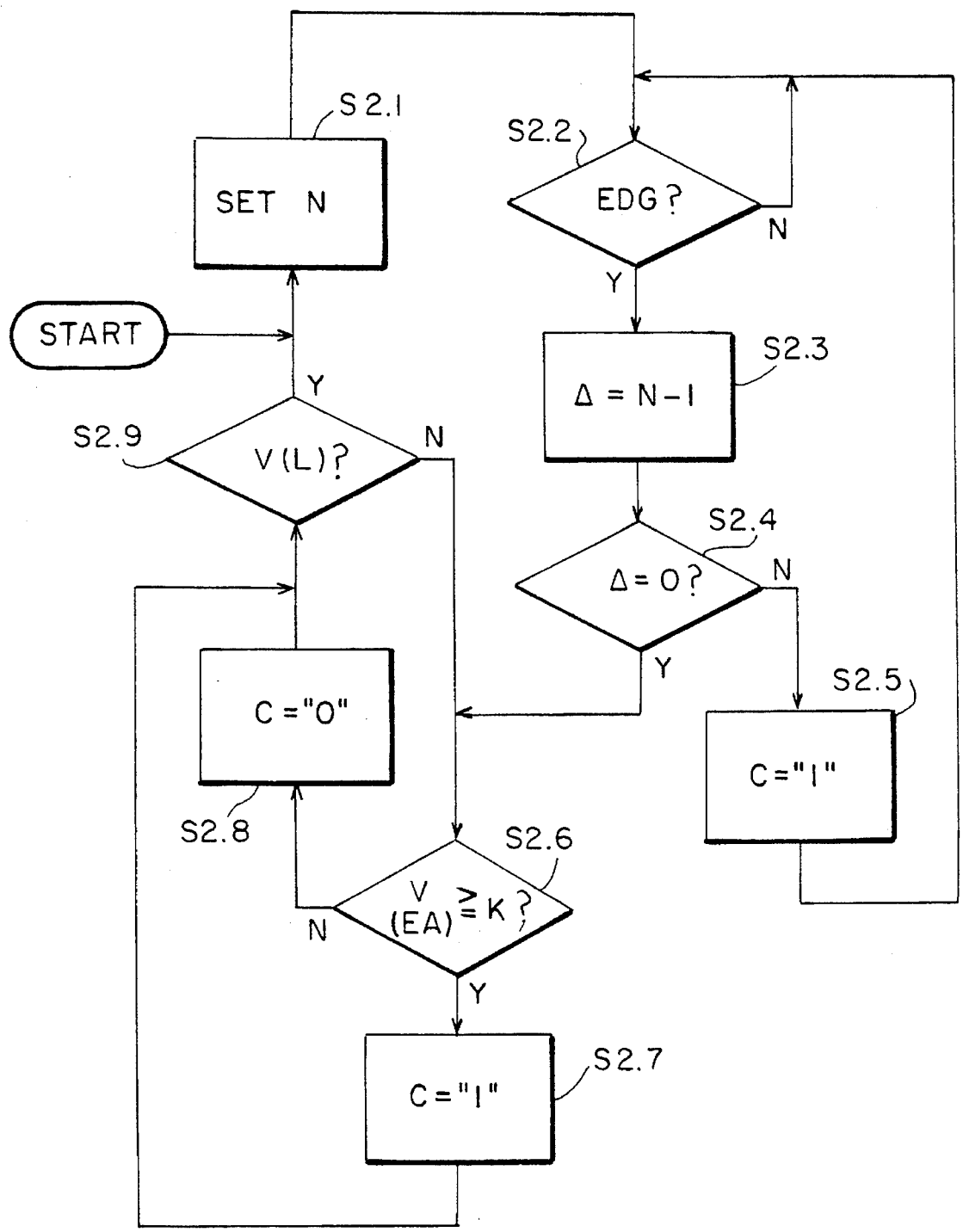
FIG. 16 is a flow chart for a controller for use in the picture signal encoding device depicted in FIG. 12.

Referring to FIG. 16 in addition to FIGS. 12 and 13, it is possible to obtain control signal C by programming the processor of the controller 45 as follows. At a first step S2.1, the integral multiple is set as an initial condition in the processor as indicated by "set N". At a second step S2.2, the processor repeatedly detects the build-up edge (EDG) of each frame pulse. At a third step S2.3, the processor calculates an integer difference Δ by subtracting one from the integral multiple. At a fourth step S2.4, the processor checks whether or not the difference is equal to zero. If the difference is not equal to zero, the processor produces at a fifth step S2.5 the control signal C with a different value, such as the binary one value, other than the predetermined value, namely, the binary zero value.

If the difference is equal to zero, the processor checks at a sixth step S2.6 whether or not the magnitudes of the motion vectors (being vector absolute values of the vectors, represented by V) are either equal to or greater than the preselected threshold value K. If the magnitudes are not less than the threshold value, the processor makes at a seventh step S2.7 the control signal C indicate the different value. If the magnitudes are less than the threshold value, the control signal C is made at an eighth step S2.8 to indicate the predetermined value. The seventh and the eighth steps proceed to a ninth step S2.9 where the processor checks whether or not the motion vector signal MV represents the motion vector that is last detected as a last vector V(L) from the pictures of the successive periods. If the motion vector signal does not represent the last vector, the ninth step returns to the sixth step. If the motion vector signal represents the last vector, the ninth step returns to the first step. Return to the sixth step S2.6 and to the first step S2.1 may be referred to as first and second additional steps.

Figure 17:
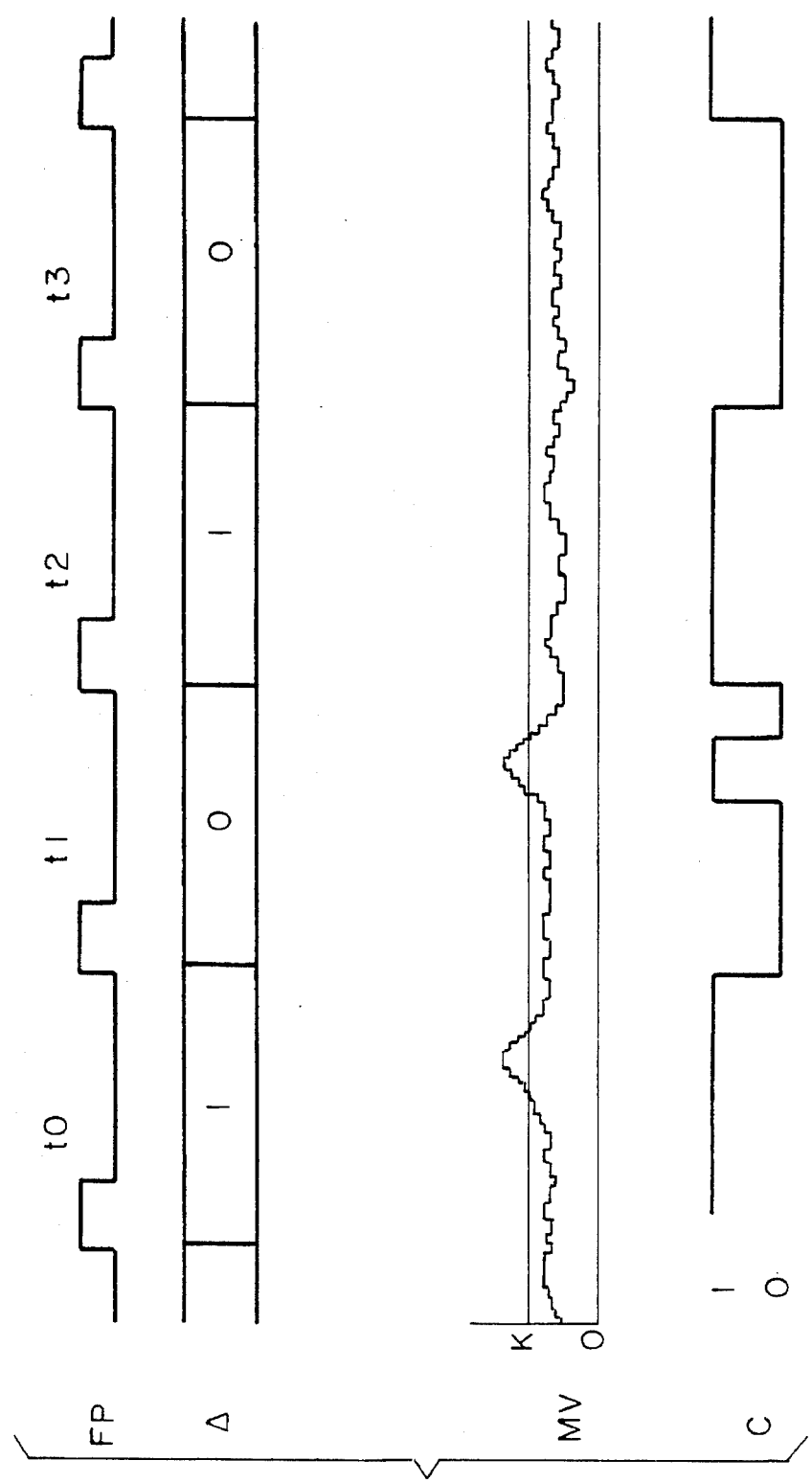
FIG. 17 is a time chart for use in describing operation of the controller operable in compliance with FIG. 16.

Turning to FIG. 17 with FIGS. 12 and 16 additionally referred to, it is once more assumed that the integral multiple is equal to two and that the initial condition is set in the processor prior to the zeroth frame pulse of the frame pulses illustrated along a first or top row labelled FP. The integer difference is shown along a second row labelled Δ. The motion vector signal is exemplified by a stepped curve along a third row labelled MV with the preselected threshold value K indicated by a horizontal line which intersects with the stepped curve. With regard to the motion vector signal exemplified along the third row, the control signal is depicted along a fourth or bottom row labelled C. When substitution of the zero signal for the prediction error signal is suspended, it is possible to reduce a code distortion which would otherwise be introduced into the picture output signal OT.

Figure 18:
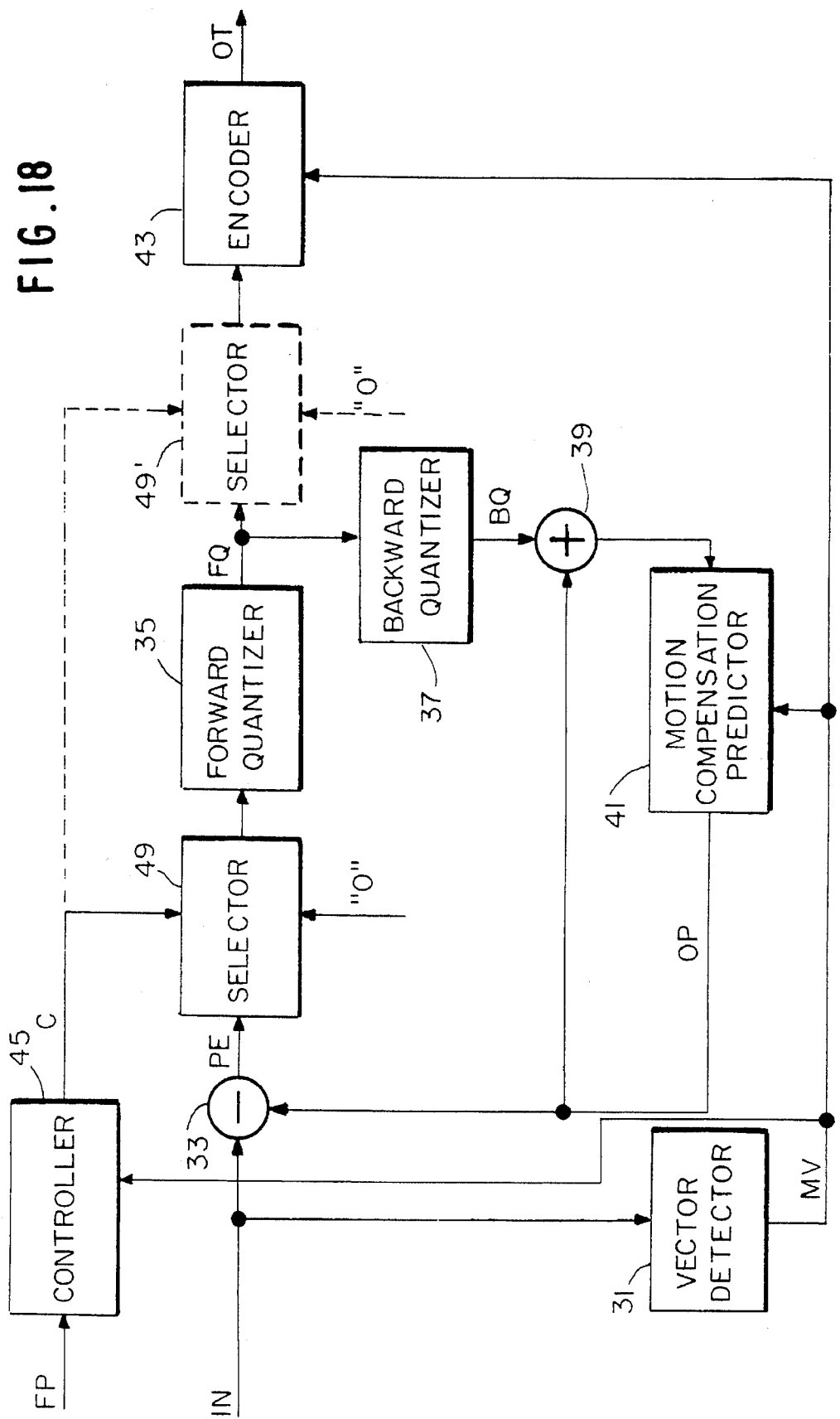
FIG. 18 is a block diagram of a picture signal encoding device according to a modification of the picture signal encoding device illustrated in FIG. 12.

Referring to FIG. 18, the description will proceed to a picture signal encoding device according to a modification of the device illustrated with reference to FIG. 12. Similar parts are designated by like reference numerals and are similarly operable with likewise named signals which are indicated by like reference symbols. The modification is similar to that described with reference to FIG. 11 in connection with the device illustrated with reference to FIG. 1.

Figure 19:
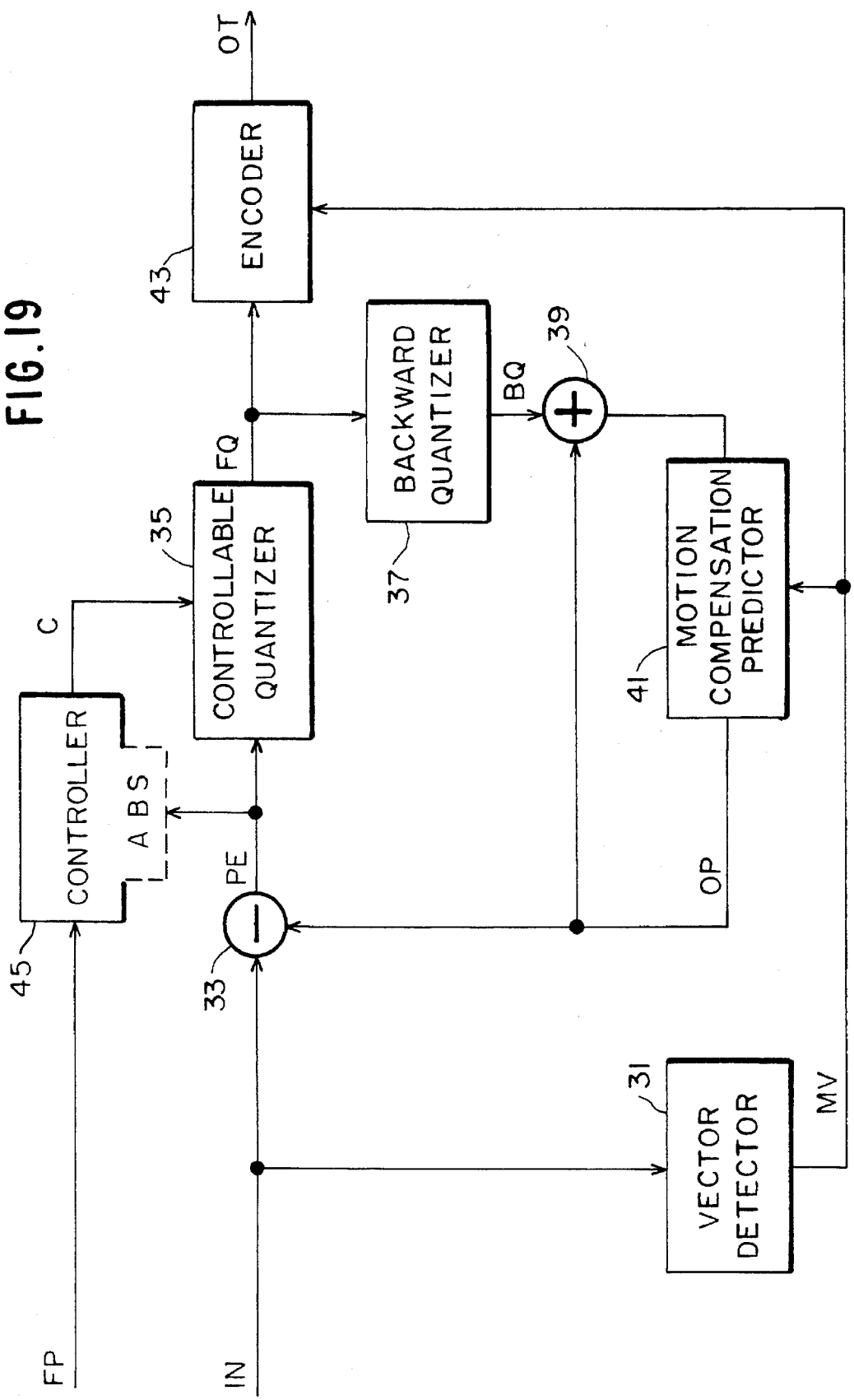
FIG. 19 is a block diagram of a picture signal encoding device according to a third embodiment of this invention.

Referring now to FIG. 19, the description will be directed to a picture signal encoding device according to a third embodiment of this invention. Similar parts are designated by like reference numerals and are similarly operable with signals which are likewise named and are indicated by like reference symbols.

It should be noted that the controller 45 is controlled by the prediction error signal PE. Responsive to the frame pulses FP, the controller 45 produces the control signal C which indicates the predetermined value, such as the binary zero value, in each of the preselected periods of the successive periods. The control signal is, however, made to indicate a different value in each duration in which the prediction error signal of each of the preselected periods has an error absolute value EA which is either equal to or greater than a preselected threshold value K. The threshold value is preselected by experiments.

Referring again to FIG. 13 with reference to FIG. 19 continued, the controller 45 may comprise the shift register 47, the controller read-only memory 51, and the OR gate 53 in the manner described before. The read-only memory 51 is now supplied with the prediction error signal PE as labelled in parentheses rather than with the motion vector signal MV. It is readily possible to make the memory output signal represent the binary zero or one value when the prediction error signal represents a particular value with the plus or the minus sign. Alternatively, it is possible to make the controller 45 accompany an absolute value circuit (ABS) indicated by a partial dashed-line rectangle.

The read-only memory 51 is preliminarily loaded with signals representative of the binary zero value in memory addresses accessed by the prediction error signal having absolute values which are less than the preselected threshold value K. Signals representative of the binary one value are preliminarily stored in other memory addresses. It is therefore understood that the control signal C indicates the predetermined value and does not in the manner described above.

Referring again to FIG. 16 with FIG. 19 continuously referred to, the controller 45 may alternatively comprise the processor. It should, however, be noted that the preselected threshold value K should be compared at the sixth step S2.6 with the error absolute value of the prediction error signal PE rather than with the magnitudes V of the motion vectors. This modification is indicated in the diamond of the sixth step S2.6 with the error absolute value EA enclosed with parentheses.

Figure 20:
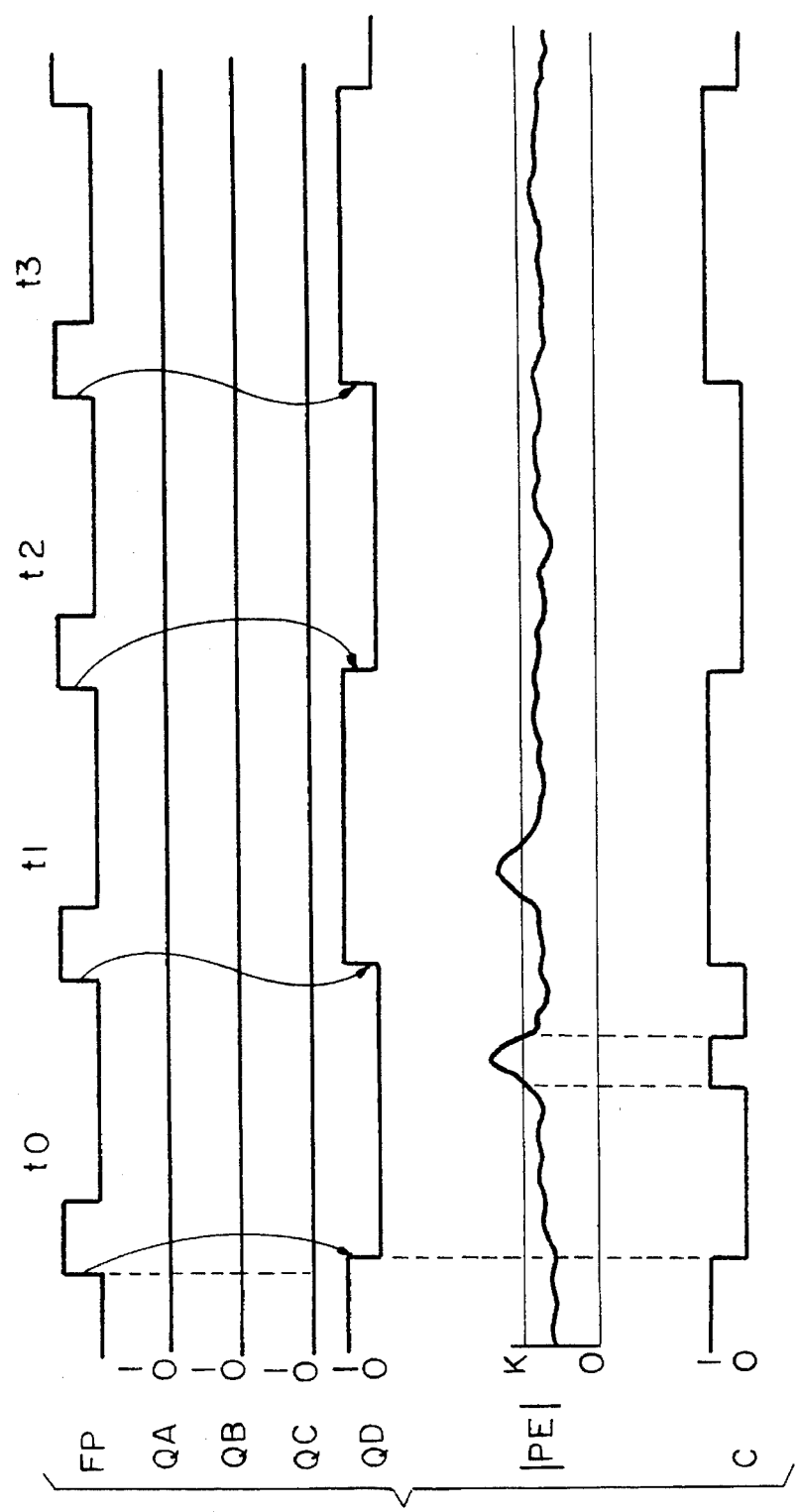
FIG. 20 is a time chart for use in describing operation of a controller which is for use in the picture signal encoding device illustrated in FIG. 19.

Turning to FIG. 20 with FIG. 13 continuously referred to, it will once again be assumed that the integral multiple is equal to two. The frame pulses are illustrated along a first or top row labelled FP. The first through the fourth output signals of the shift register 47 are depicted along second through fifth rows labelled QA to QD. The absolute values of the prediction error signal PE are exemplified by a curve along a sixth row labelled |PE| with the preselected threshold value K indicated by a horizontal line which crosses the curve. In connection with the absolute values exemplified along the sixth row, the control signal indicates the binary one and zero levels in the manner shown along a seventh or bottom row labelled C.

Figure 21:
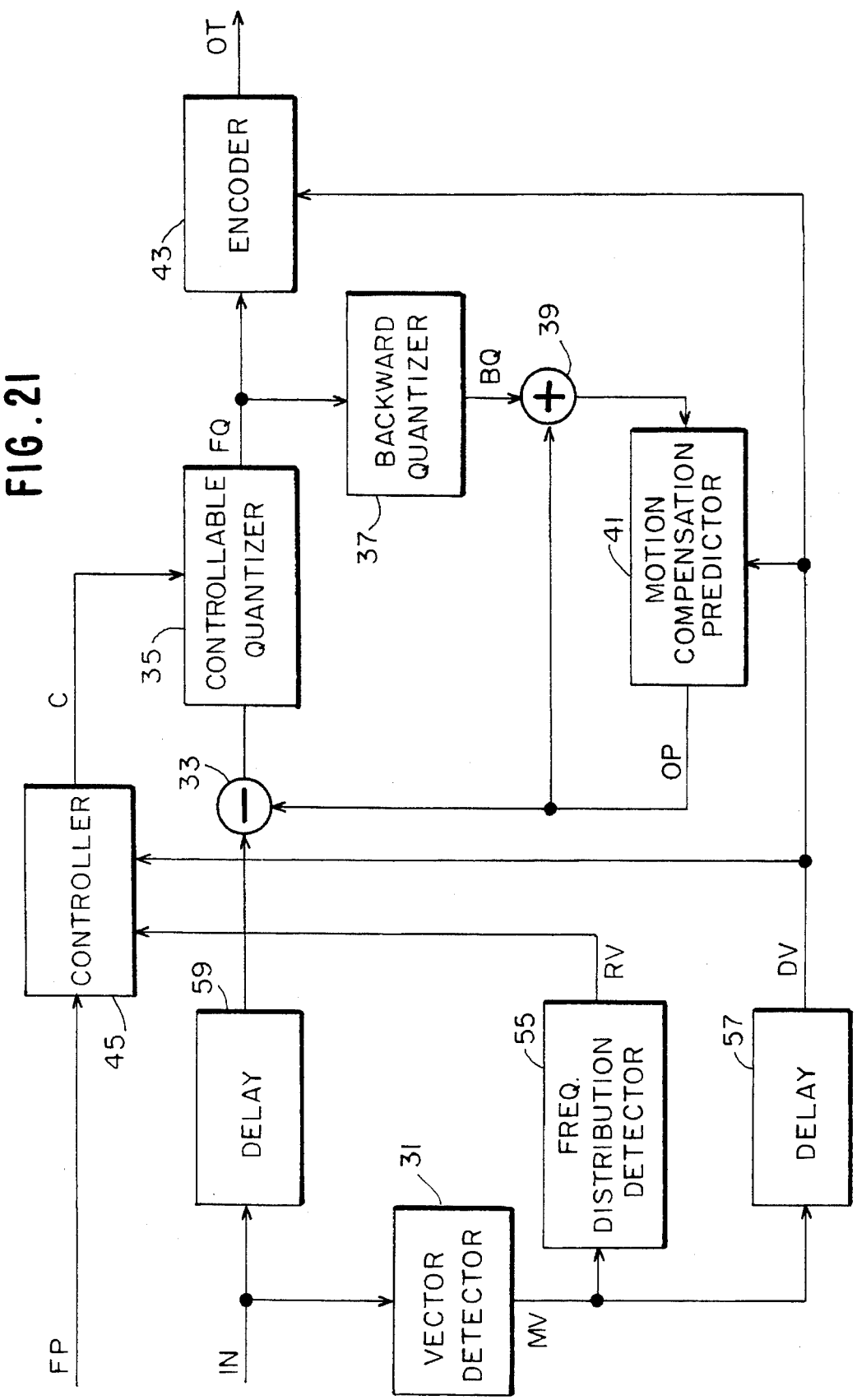
FIG. 21 is a block diagram of a picture signal encoding device according to a fourth embodiment of this invention.

Referring now to FIG. 21, attention will be directed to a picture signal encoding device according to a fourth embodiment of this invention. Similar parts are designated by like reference numerals and are similarly operable with likewise named signals. In this connection, it should be noted that the motion vector signal MV is supplied to a frequency distribution detector 55 for detecting frequency distribution of the motion vectors V represented by the motion vector signal MV.

Figure 22:
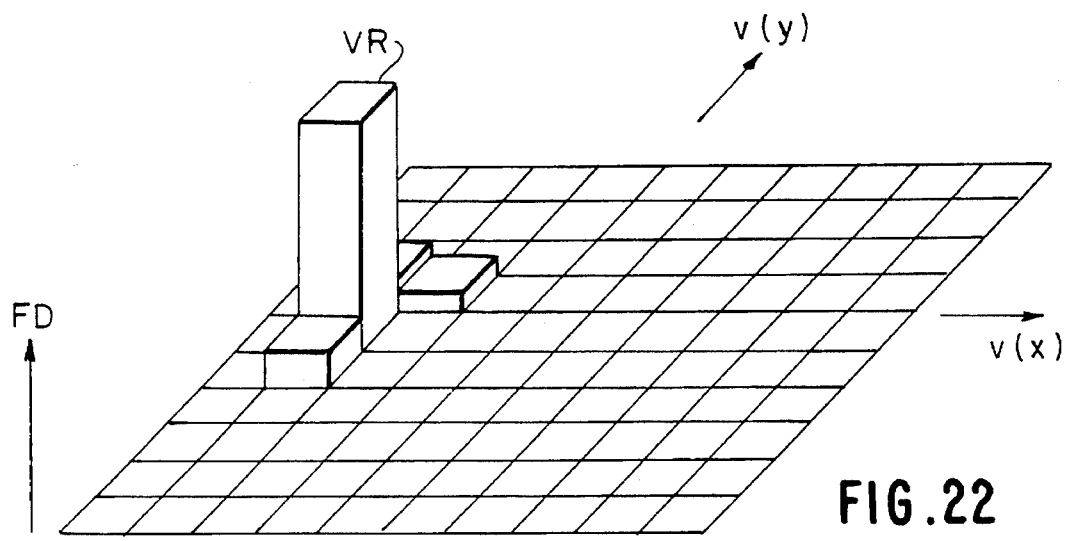
FIG. 22 shows a velocity component plane for use in describing operation of the picture signal encoding device illustrated in FIG. 21.

Turning temporarily to FIG. 22, a v(x)-v(y) plane is perspectively depicted by a rhombic outline to represent horizontal components v(x) and vertical components v(y) of the motion vectors in one of the pictures. It was described before with reference to FIGS. 2 and 4 that most of the motion vectors may have a common magnitude and a common direction with sense. When most of the motion vectors have the common magnitude and the common directions with sense, the motion vectors very frequently appear with a particular component combination (v(x), v(y)) in the manner exemplified with a frequency distribution or a frequency of occurrence FD depicted perpendicular to the v(x)-v(y) plane. In such an event, it is possible to use a representative vector VR in place of a plurality of motion vectors having the particular component combination and to deal with a reduced amount of encoded information if the representative vector is skillfully used. It should be noted that the representative vector is designated by usual letters merely for simplicity or convenience of the description.

Turning back to FIG. 21, the frequency distribution detector 55 is for calculating the frequency distribution described in the foregoing to find the representative vector VR and to produce a representative vector signal RV representative of the representative vectors from time to time. The representative vector signal is supplied to the controller 45. Giving a delay to the motion vector signal MV, a motion vector signal delay circuit 57 supplies a delayed vector signal DV to the controller 45 concurrently with supply of the representative vector signal thereto. The delayed vector signal is delivered furthermore to the motion compensation predictor 41 and to the encoder 43. Giving the delay to the picture input signal IN, a picture input signal delay circuit 59 delivers a delayed input signal to the subtracter 33 concurrently with production of the representative vector signal by the frequency distribution detector 55.

The frequency distribution detector 55 is readily implemented as follows. It will be presumed in the following that each motion vector represents a displacement, from a picture element of a horizontal line, of up to eight pels rightwards, eight pels leftwards, eight lines upwards, and eight lines downwards. In this event, each of the horizontal and the vertical components of the motion vector v(x) and v(y) has one of seventeen horizontal and seventeen vertical values, namely, one of 289 values.

The frequency distribution detector 55 may therefore comprise 289 counters in correspondence to the seventeen horizontal and the seventeen vertical values of each displacement. The counters are reset to zero at the beginning of each frame period.

When the vector detector 31 detects each motion vector, a count of one is accumulated in one of the counters that corresponds to a horizontal component and a vertical component of the motion vector under consideration. At the end of the frame period, the frequency distribution FD is represented by counts accumulated in the counters. For example, let one hundred motion vectors be used per picture. A count of 50 is accumulated at the end of a frame period in one of the counters that correspond to the horizontal component of plus one and the vertical component of plus one; another count of 30, in the counter corresponding to the horizontal component of plus two and the vertical component of plus two; and still another count of 20, in the counter corresponding to the horizontal component of plus three and the vertical component of plus three. Under the circumstances, the frequency distribution is represented by counts 50 for v(x)=v(y)=1, 30 for v(x)=v(y)=2, and 20 for v(x)=v(y)=3.

The frequency distribution detector 55 may alternatively be a random access memory having 289 memory addresses in correspondence to the seventeen horizontal and the seventeen vertical values of the displacement of each picture element in each horizontal line. At the beginning of each frame period, the random access memory is reset so that a content of zero be stored in each of the memory addresses.

When the vector detector 31 detects each motion vector, the content is renewed by accumulation of one in one of the memory addresses that corresponds to a horizontal and a vertical component of the motion vector in equation. At the end of the frame period, the frequency distribution FD is represented by contents of the memory addresses. In the above-cited numerical example, a content of 50 is stored at the end of a frame period in one of the memory addresses that corresponds to the horizontal component of plus one and the vertical component of plus one; another content of 30, in the memory address corresponding to the horizontal component of plus two and the vertical component of plus two; and still another content of 20, in the memory address corresponding to the horizontal component of plus three and the vertical component of plus three. The frequency distribution is represented by contents of 50 for v(x)= v(y)=1, 30 for v(x)=v(y)=2, and 20 for v(x)=v(y)=3.

Figure 23:
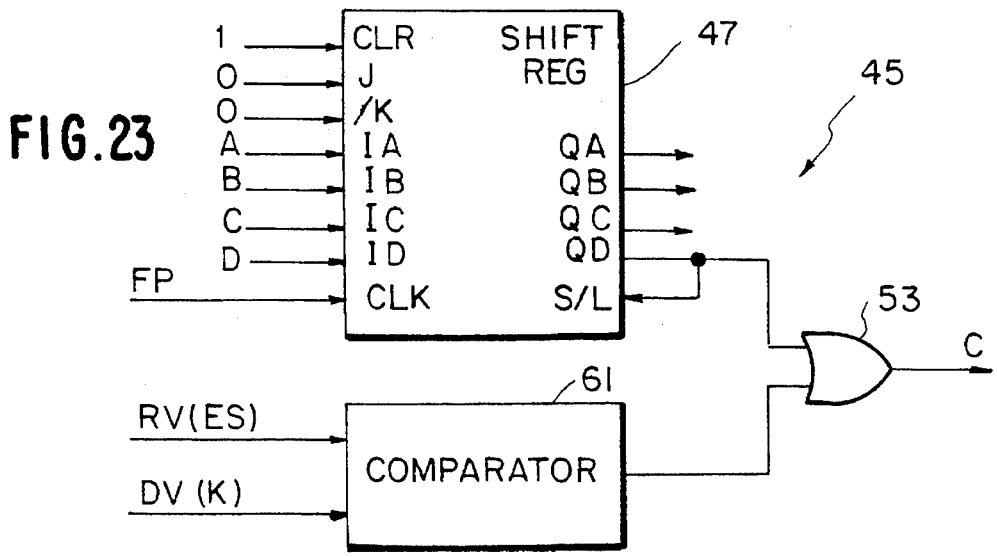
FIG. 23 is a block diagram of a controller for use in the picture signal encoding device depicted in FIG. 21.

Turning now to FIG. 23 during a short while, the controller 45 comprises the shift register 47 and the OR gate 53 described in conjunction with FIG. 13. In the manner described with reference to FIG. 13, it is possible to substitute the processor described in connection with FIG. 9 for the shift register 47. The controller internal signal is produced as before.

A comparator 61 is used in lieu of the controller read-only memory 51 depicted in FIG. 13. Simultaneously supplied with the representative (RV) and the delayed (DV) vector signals, the comparator 61 compares the representative vector VR with delayed vectors VD represented by the delayed vector signal. The comparator 61 produces a result signal P representative of whether the delayed vectors are identical with the representative vector. When each delayed vector is identical with the representative vector, the result signal is given the binary zero value. otherwise, the reset signal is given the binary one value.

It is now understood that the OR gate 53 produces the control signal C indicative of the predetermined or the binary zero value substantially in each of the preselected periods of the successive periods. When the delayed vectors are not identical with the representative vector in each of the preselected periods, the control signal is given the binary one value. In this manner, it is possible to say with the delay neglected that the control signal is given the binary one value in each duration in which the motion vectors V are not identical with the representative vector VR in each of the preselected periods.

Further turning to FIG. 24, it is possible to program the processor of the controller 45 substantially as described with reference to FIG. 16. It should, however, be noted that the processor compares at the sixth step S2.6 the delayed vectors VD with the representative vector VR. If the delayed vectors are not identical with the representative vector, the sixth step in question proceeds to the seventh step S2.7 of giving the binary one value to the control signal C. If the delayed vectors are identical with the representative vector, this sixth step proceeds to the eighth step S2.8 of giving the binary zero value to the control signal.

Figure 25:
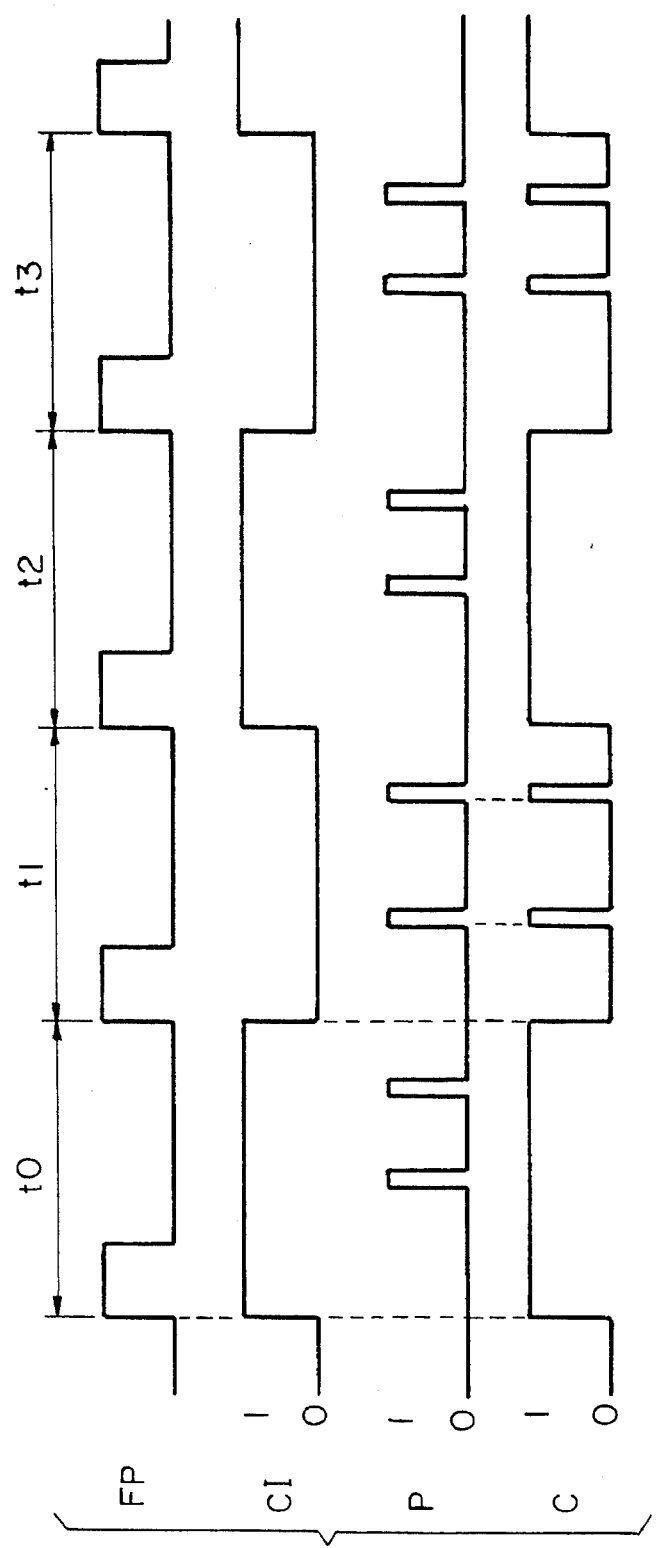
FIG. 25 is a time chart for use in describing operation of the controller illustrated in FIG. 23.

Still further turning to FIG. 25 with FIG. 23 additionally referred to, it is once again assumed that the integral multiple is equal to two. The frame pulses are illustrated along a first or top row labelled FP. The controller internal signal of the shift register 47 or of the microprocessor described in conjunction with FIG. 9 is depicted along a second row labelled CI. The result signal is exemplified along a third row labelled P. When the comparator 61 produces the result signal in the manner exemplified along the third row, the control signal is given the binary zero and one values as depicted along a fourth or bottom row labelled C.

Turning back once more to FIG. 21, the control signal C is supplied to the forward quantizer 35 which is the controllable quantizer in the example being illustrated. With the binary one value given temporarily to the control signal in each of the preselected periods, it is possible to suppress the code distortion. It is possible to use, instead of the controllable quantizer, the forward quantizer 35 together with the selector 49 which is described in connection with FIGS. 11 and 18. The selector 47 may be placed either on an input side or on the output side of the forward quantizer 35. This applies to the picture signal encoding device illustrated with reference to FIG. 19.

Reviewing FIGS. 21 through 25, the zero signal is not substituted for the prediction error signal PE during an interval of time during which the motion vectors are different vectors (excluding zero vectors) which are different from the representative vector VR. This reduces the amount of encoded information and suppresses the encoding distortion.

Figure 26:
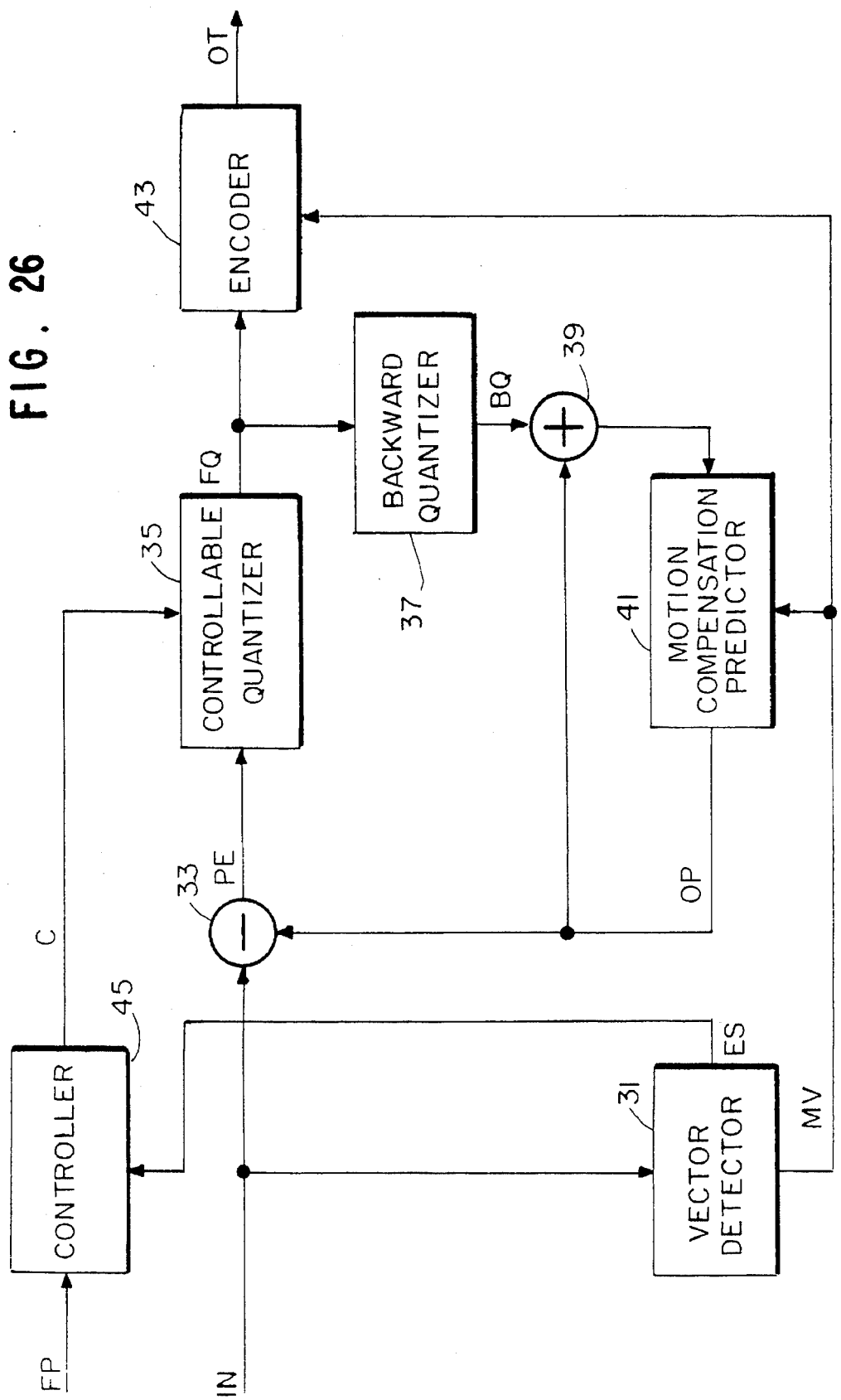
FIG. 26 is a block diagram of a picture signal encoding device according to a fifth embodiment of this invention.

Referring now to FIG. 26, the description will be directed to a picture signal encoding device according to a fifth embodiment of this invention. Similar parts are designated by like reference numerals and are similarly operable with signals which are likewise named and indicated by like reference symbols. It should be noted in the example being illustrated that the controller 45 is supplied from the motion vector detector 31 with an evaluation signal ES representative block by block of an evaluation value EV which will become clear in the following. For this purpose, the motion vector detector 31 detects the motion vectors on the block by block basis rather than in connection with each pair of corresponding picture elements in the current and the previous pictures.

Figure 27:
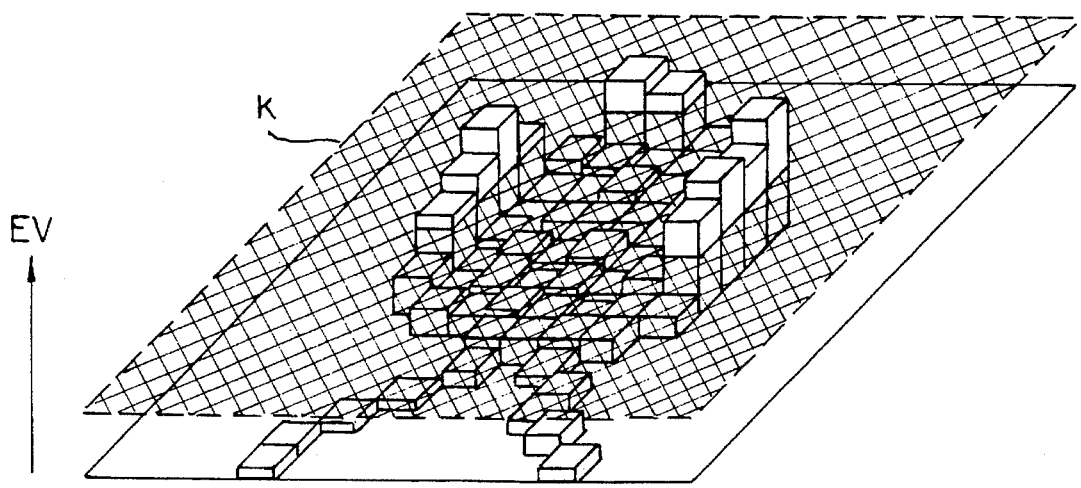
FIG. 27 shows a current picture for use in describing operation of the picture signal encoding device illustrated in FIG. 26.

Turning to FIG. 27 with FIG. 26 continuously referred to, the current picture of the current frame is perspectively depicted by a solid-line rhomb. It is presumed that the control signal C is given the predetermined or the binary zero value during the current frame according to the illustration made with reference to either FIG. 6 or FIG. 9. The blocks are exemplified as current blocks in the current picture by small rhombs. In the previous picture (not herein shown), the blocks are selected in positional correspondence to the current blocks as corresponding blocks. This is readily possible because the motion vector detector 31 detects the displacement described in conjunction with FIG. 3 in which the blocks are illustrated with the displacement taken into consideration.

The motion vector of the current block is compared with the motion vector of the corresponding block to calculate a correlation degree between the motion vectors under consideration. The correlation is calculated in the manner described with reference to FIG. 3. A reciprocal or a like value representative of the correlation degree is used as the evaluation value.

Such evaluation values EV are illustrated by columns standing upright on the current blocks. The evaluation value is infinitesimal where neither the current blocks nor the columns representative of the evaluation values are depicted.

It is readily understood that the picture output signal OT would be subjected to a least code distortion even if the zero signal is substituted for the prediction error signal PE produced in connection with each current block which has a small evaluation value, namely, a great correlation degree, and results in an accordingly excellent motion compensation. The evaluation value is therefore compared with a preselected threshold value K represented by a net-like plane in the figure being illustrated. The threshold value is empirically determined.

Referring again to FIG. 23 with FIG. 26 additionally referred to, the comparator 61 is supplied with the evaluation signal ES and with the preselected value K in the manner labelled with these reference symbols enclosed with parentheses. It is possible to use instead of the comparator 61 the controller read-only memory 51 described in connection with FIG. 13. In any event, the control signal C indicates the predetermined or the binary zero value in each of the preselected periods of the successive periods. The binary one value is, however, substituted for the binary zero value in each duration in which the evaluation value is either equal to or higher than the threshold value.

Turning again to FIG. 24, the processor is programmed to check at the sixth step S2.6 whether or not the threshold value K is less than the evaluation value EV. This check is depicted in parentheses. In other respects, the processor is programmed in the manner described with reference to FIG. 24.

Figure 24:
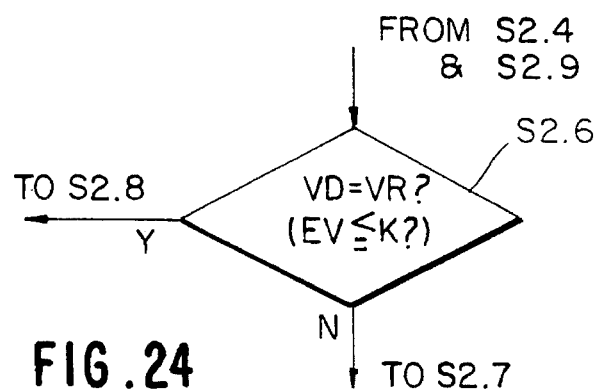
FIG. 24 shows a part of a flow chart for use in describing operation of a controller which is for use in the picture signal encoding device depicted in FIG. 21.

Further turning to FIG. 28 with FIGS. 26 and 23 or 24 additionally referred to, it will once again be assumed that the integral multiple is equal to two. The frame pulses are illustrated along a first or top row labelled FP. The evaluation value is exemplified by a stepped curve along a second or middle row labelled EV with the preselected threshold value K indicated by a horizontal line which crosses the stepped curve. When the evaluation value varies in the manner, the binary zero and one values are indicated by the control signal as depicted along a third or bottom row labelled C.

Turning back to FIG. 26, the control signal C is supplied to the controllable quantizer 35. The picture output signal OT represents the pictures which are adapted to reproduction with smooth movement of the movable part between successively reproduced pictures and yet with an increased number of pictures per unit time. It is again possible to use, instead of the controllable quantizer, the forward quantizer 35 together with the selector 47 which is described in conjunction with FIG. 11 or 18. The selector 49 can be placed on whichever of the input and the output sides of the forward quantizer 5.

Reviewing FIGS. 12 through 28, it is understood that the control signal C indicates the predetermined value substantially in each of the preselected periods, namely, at most throughout each of the preselected periods. Preferably, the zero signal should not be substituted for the different signal, namely, for the prediction error signal PE, in each duration predetermined either by the motion vector signal or the prediction error signal.

While this invention has thus far been described in specific conjunction with several preferred embodiments thereof and several modifications, it is now readily possible for one skilled in the art to put this invention into practice in various other manners. For example, a further reduction of the amount of encoded information is possible by using a forward orthogonal transform circuit after the subtracter 33 and a backward orthogonal transform circuit after the backward quantizer 37.

What is claimed is:

1. A picture signal encoding device operable as a block matching type motion compensation encoding device comprising:

a motion vector detector for producing a motion vector signal representative of a displacement of a movable part between two of a plurality of pictures which are represented by a picture input signal in successive periods recurring at a predetermined interval;

controllable predictive quantizing means for controllably quantizing into a quantized signal a prediction error signal derived from said picture input signal and said motion vector signal;

a controller for producing a control signal indicative of a predetermined value in each of preselected periods of said successive periods; and control signal supply means for supplying said control signal to said controllable predictive quantizing means to make said controllable predictive quantizing means produce said quantized signal by substituting a zero signal for said prediction error signal when said control signal indicates said predetermined value;

said picture signal encoding device encoding said motion vector signal and said quantized signal into a picture output signal with said motion vector signal encoded irrespective of said control signal and with said prediction error signal and said zero signal selectively used to form said quantized signal responsive to said control signal.

2. A picture signal encoding device as claimed in claim 1, wherein said encoder encoding device said motion vector signal into a vector representing code and said zero signal into a zero representing code to produce vector representing code and the zero representing code collectively as said picture output signal when said controllable predictive quantizing means uses said zero signal in place of said error signal.

3. A picture signal encoding device as claimed in claim 2, wherein said controllable predictive quantizing means comprises:

a subtracter for calculating a difference between said picture input signal and a subtracter input signal to produce a difference signal representative of said difference as said prediction error signal;

controllable quantizing means for controllably quantizing said difference signal into said quantized signal;

a backward quantizer for dequantizing said quantized signal into a dequantized signal;

a decoding and motion compensating circuit for subjecting said motion vector signal and said dequantized signal to block matching to produce an optimum prediction signal predictive of said picture input signal with a prediction error minimized; and prediction signal supply means for supplying said optimum prediction signal to said subtracter as said subtracter input signal;

said control signal supply means supplying said control signal to said controllable quantizing means to make said controllable quantizing means produce said quantized signal with said zero signal substituted for said error signal when said control signal indicates said predetermined value.

4. A picture signal encoding device as claimed in claim 3, wherein:

said controllable quantizing means comprises a controllable quantizer for quantizing said difference signal into said quantized signal;

said control signal supply means supplying said control signal to said controllable quantizer to make said controllable quantizer produce said quantized signal with said zero signal substituted for said difference signal when said control signal indicates said predetermined value.

5. A picture signal encoding device as claimed in claim 3, wherein said controllable quantizing means comprises:

a selector connected to said control signal supply means for selecting said zero signal and said difference signal as a selected signal when said control signal indicates said predetermined value and a forward quantizer for quantizing said selected signal into said quantized signal.

6. A picture signal encoding device as claimed in claim 3, wherein said controllable quantizing means comprises:

a forward quantizer for quantizing said difference signal into a quantizer output signal; and a selector connected to said control signal supply means for selecting said zero signal and said quantizer output signal as said quantized signal when said control signal indicates said predetermined value.

7. A picture signal encoding device as claimed in claim 1, wherein each of said preselected periods appears once in an integral multiple of said predetermined interval.

8. A picture signal encoding device as claimed in claim 7, wherein said controller comprises a parallel access shift register supplied as clock pulses with frame pulses defining said successive periods and with a plurality of register input signals collectively indicative of said integral multiple to produce said control signal.

9. A picture signal encoding device as claimed in claim 7, wherein said controller is programmed to be operable in:

a first step of putting said integral multiple in said controller as an initial condition;

a second step of repeatedly detecting a leading edge of each of frame pulses defining said successive periods;

a third step of obtaining an integer difference by subtracting one from said initial condition when said leading edge is detected;

a fourth step of checking whether or not said integer difference is equal to zero;

a fifth step of making said control signal indicate said predetermined value when said integer difference is equal to zero; and a sixth step of making said control signal indicate another value when said integer difference is not equal to zero.

10. A picture signal encoding device as claimed in claim 1, wherein said preselected periods are preselected in accordance with said successive periods and said motion vector signal.

11. A picture signal encoding device as claimed in claim 10, wherein each of said preselected periods appears once in an integral multiple of said predetermined interval without said zero signal substituted for said difference signal in each duration in which said motion vector signal represents in each of said preselected periods motion vectors having magnitudes which are not less than a preselected threshold value.

12. A picture signal encoding device as claimed in claim 11, wherein said controller comprises:

a parallel access shift register supplied as clock pulses with frame pulses defining said successive periods and with a plurality of register input signals collectively indicative of said integral multiple to produce a controller internal signal indicative of said predetermined value and a different value other than said predetermined value, one at a time;

a read-only memory accessed by said motion vector signal to produce a memory output signal indicative of said predetermined value and said different value when said motion vector signal represents the magnitudes which are and are not, respectively, less than said threshold value; and an OR gate supplied with said internal signal and said memory output signal to produce said control signal.

13. A picture signal encoding device as claimed in claim 11, wherein said controller is programmed to be operable in:

a first step of putting said integral multiple in said controller as an initial condition;

a second step of repeatedly detecting a leading edge of each of frame pulses defining said successive periods;

a third step of obtaining an integer difference by subtracting one from said initial condition when said leading edge is detected;

a fourth step of checking whether or not said integer difference is equal to zero;

a fifth step of making said control signal indicate a different value other than said predetermined value when said integer difference is not equal to zero;

a sixth step of checking whether or not said magnitudes are not less than said threshold value when said integer difference is equal to zero;

a seventh step of making said control signal indicate said different value when said magnitudes are greater than said threshold value;

an eighth step of making said control signal indicate said predetermined value when said magnitudes are less than said threshold value;

a ninth step of checking whether or not said motion vector signal represents each of said motion vectors as a last vector in the pictures of said successive periods;

a first additional step of repeating said sixth step through said ninth step when said motion vector signal does not represent said last vector; and a second additional step of returning to said first step when said motion vector signal represents said last vector.

14. A picture signal encoding device as claimed in claim 11, wherein said controller comprises:

a processor programmed to be operable in:

a first step of putting said integral multiple in said processor as an initial condition;

a second step of repeatedly detecting a leading edge of each of frame pulses defining said successive periods;

a third step of obtaining an integer difference by subtracting one from said initial condition when said leading edge is detected;

a fourth step of checking whether or not said integer difference is equal to zero;

a fifth step of producing a controller internal signal indicative of a different value other than said predetermined value when said integer difference is not equal to zero; and a sixth step of making said internal signal indicate said predetermined value when said integer difference is equal to zero;

a read-only memory accessed by said motion vector signal to produce a memory output signal indicative of said predetermined value and said different value when said motion vector signal represents the magnitudes which are and are not, respectively, less than said threshold value; and an OR gate supplied with said internal signal and said memory output signal to produce said control signal.

15. A picture signal encoding device as claimed in claim 10, wherein each of said preselected periods appears once in an integral multiple of said predetermined interval without said zero signal substituted for said difference signal in each duration in which said motion vector signal represents different vectors which are not identical with a representative vector representative of a displacement of said movable part.

16. A picture signal encoding device as claimed in claim 15, wherein said controller comprises:

a parallel access shift register supplied as clock pulses with frame pulses defining said successive periods and with a plurality of register input signals collectively indicative of said integral multiple to produce a controller internal signal indicative of said predetermined value and a different value other than said predetermined value, one at a time;

a comparator for comparing motion vectors with said representative vector to produce a comparator output signal indicative of said predetermined value and said different value when said motion vectors are and are not identical with said representative vector; and an OR gate supplied with said internal signal and said comparator output signal to produce said control signal.

17. A picture signal encoding device as claimed in claim 15, wherein said controller is programmed to be operable in:

a first step of putting said integral multiple in said controller as an initial condition;

a second step of repeatedly detecting a leading edge of each of frame pulses defining said successive periods;

a third step of obtaining an integer difference by subtracting one from said initial condition when said leading edge is detected;

a fourth step of checking whether or not said integer difference is equal to zero;

a fifth step of making said control signal indicate a different value other than said predetermined value when said integer difference is not equal to zero;

a sixth step of comparing said motion vectors with said representative vector to judge whether said motion vectors are or are not identical with said representative vector when said integer difference is equal to zero;

a seventh step of making said control signal indicate said different value when said motion vectors are not identical with said representative vector;

an eighth step of making said control signal indicate said predetermined value when said motion vectors are identical with said representative vector;

a ninth step of checking whether or not said motion vector signal represents each of said motion vectors as a last vector in the pictures of said successive periods;

a first additional step of repeating said sixth step through said ninth step when said motion vector signal does not represent said last vector; and a second additional step of returning to said first step when said motion vector signal represents said last vector.

18. A picture signal encoding device as claimed in claim 15, wherein said controller comprises:

a processor programmed to be operable in:

a first step of putting said integral multiple in said processor as an initial condition;

a second step of repeatedly detecting a leading edge of each of frame pulses defining said successive periods;

a third step of obtaining an integer difference by subtracting one from said initial condition when said leading edge is detected;

a fourth step of checking whether or not said integer difference is equal to zero;

a fifth step of producing a controller internal signal indicative of a different value other than said predetermined value when said integer difference is not equal to zero; and a sixth step of making said internal signal indicate said predetermined value when said integer difference is equal to zero;

a comparator for comparing said motion vectors with said representative vector to produce a comparator output signal indicative of said predetermined valve and said different value when said motion vectors are and are not, respectively, identical with said representative vector; and an OR gate supplied with said internal signal and said comparator output signal to produce said control signal.

19. A picture signal encoding device as claimed in claim 10, each of said pictures being divided into blocks corresponding to one another between a current picture and a previous picture of the pictures of said successive periods, each of motion vectors represented by said motion vector signal in the blocks of said current picture having a correlation degree relative to one of motion vectors represented by said motion vector signal in the blocks corresponding in said previous picture to the blocks of said current picture, wherein each of said preselected periods appears once in an integral multiple of said predetermined interval without said zero signal substituted for said difference signal in each duration in which said correlation degree is less than a preselected threshold value between the motion vectors represented by said motion vector signal in the current picture for which said zero signal is substituted for said difference signal and said previous period.

20. A picture signal encoding device as claimed in claim 19, wherein said controller comprises:

a parallel access shift register supplied as clock pulses with frame pulses defining said successive periods and with a plurality of register input signals collectively indicative of said integral multiple to produce a controller internal signal indicative of said predetermined value and a different value other than said predetermined value, one at a time;

a read-only memory accessed by said motion vector signal to produce a memory output signal indicative of said predetermined valve and said different value when said correlation degree is not, respectively, and is less than said threshold value; and an OR gate supplied with said internal signal and said memory output signal to produce said control signal.

21. A picture signal encoding device as claimed in claim 19, wherein said controller is programmed to be operable in:

a first step of putting said integral multiple in said controller as an initial condition;

a second step of repeatedly detecting a leading edge of each of frame pulses defining said successive periods;

a third step of obtaining an integer difference by subtracting one from said initial condition when said leading edge is detected;

a fourth step of checking whether or not said integer difference is equal to zero;

a fifth step of making said control signal indicate a different value other than said predetermined value when said integer difference is not equal to zero;

a sixth step of checking whether said correlation degree is or is not less than said threshold value when said integer difference is equal to zero;

a seventh step of making said control signal indicate said different value when said correlation degree is less than said threshold value;

an eighth step of making said control signal indicate said predetermined value when said correlation degree is not less than said threshold value;

a ninth step of checking whether or not said motion vector signal represents each of motion vectors as a last vector in the pictures of said successive periods;

a first additional step of repeating said sixth step through said ninth step when said motion vector signal does not represent said last vector; and a second additional step of returning to said first step when said motion vector signal represents said last vector.

22. A picture signal encoding device as claimed in claim 19, wherein said controller comprises:

a processor programmed to be operable in:

a first step of putting said integral multiple in said processor as an initial condition;

a second step of repeatedly detecting a leading edge of each of frame pulses defining said successive periods;

a third step of obtaining an integer difference by subtracting one from said initial condition when said leading edge is detected;

a fourth step of checking whether or not said integer difference is equal to zero;

a fifth step of producing a controller internal signal indicative of a different value other than said predetermined value when said integer difference is not equal to zero; and a sixth step of making said internal signal indicate said predetermined value when said integer difference is equal to zero;

a read-only memory accessed by said motion vector signal to produce a memory output signal indicative of said predetermined value and said different value when said correlation degree is not and is, respectively, less than said threshold value; and an OR gate supplied with said internal signal and said memory output signal to produce said control signal.

23. A picture signal encoding device as claimed in claim 1, wherein said preselected periods are preselected in accordance with said successive periods and said prediction error signal.

24. A picture signal encoding device as claimed in claim 23, wherein each of said preselected periods appears once in an integral multiple of said predetermined interval without said zero signal substituted for said difference signal in each duration in which said prediction error signal has an absolute value which is not less than a preselected threshold value.

25. A picture signal encoding device as claimed in claim 24, wherein said controller comprises:

a parallel access shift register supplied as clock pulses with frame pulses defining said successive periods and with a plurality of register input signals collectively indicative of said integral multiple to produce a controller internal signal indicative of said predetermined value and a different value other than said predetermined value, one at a time;

a read-only memory accessed by said prediction error signal to produce a memory output signal indicative of said predetermined value and said different value when said absolute value is and is not, respectively, less than said threshold value; and an OR gate supplied with said internal signal and said memory output signal to produce said control signal.

26. A picture signal encoding device as claimed in claim 24, wherein said controller is programmed to be operable in:

a first step of putting said integral multiple in said controller as an initial condition;

a second step of repeatedly detecting a leading edge of each of frame pulses defining said successive periods;

a third step of obtaining an integer difference by subtracting one from said initial condition when said leading edge is detected;

a fourth step of checking whether or not said integer difference is equal to zero;

a fifth step of making said control signal indicate a different value other than said predetermined value when said integer difference is not equal to zero;

a sixth step of checking whether said absolute value is or is not less than said threshold value;

an eighth step of making said control signal indicate said predetermined value when said absolute value is less than said threshold value;

a ninth step of checking whether or not said motion vector signal represents each of motion vectors as a last vector in the pictures of said successive periods;

a first additional step of repeating said sixth step through said ninth step when said motion vector signal does not represent said last vector; and a second additional step of repeating said first step when said motion vector signal represents said last vector.

27. A picture signal encoding device as claimed in claim 24, wherein said controller comprises:

a processor programmed to be operable in:

a first step of putting said integral multiple in said processor as an initial condition;

a second step of repeatedly detecting a leading edge of each of frame pulses defining said successive periods;

a third step of obtaining an integer difference by subtracting one from said initial condition when said leading edge is detected;

a fourth step of checking whether or not said integer difference is equal to zero;

a fifth step of producing a controller internal signal indicative of a different value other than said predetermined value when said integer difference is not equal to zero; and a sixth step of making said internal signal indicate said predetermined value when said integer difference is equal to zero;

a read-only memory accessed by said prediction error signal to produce memory output signal indicative of said predetermined value and said different value when said absolute value is and is not, respectively, less than said threshold value; and an OR gate supplied with said internal signal and said memory output signal to produce said control signal.

28. A picture signal encoding device for encoding a picture input signal representative of plurality of pictures in successive periods recurring at a predetermined interval into a picture output signal representative of said pictures with a predetermined bit rate, each of said pictures having a movable part movable between a current picture represented by said input signal during a current period of said successive periods and a previous picture represented by said input signal one predetermined interval prior to said current period, said picture signal encoding device comprising:

a motion vector supplied with said input signal for detecting a motion vectors in said movable part to produce a motion vector signal representative of said motion vectors;

controllable predictive quantizing means for producing a predicted input signal with said motion vector signal used to carry out block match between said current picture and said previous picture with motion compensation and with error minimization in producing a prediction error signal representative of a difference between said picture input signal and said predicted input signal and for controllably quantizing said prediction error signal into a quantized signal;

an encoder for encoding said motion vector signal and said quantized signal into said output signal;

a controller for producing a control signal indicative of a predetermined value in each of preselected periods of said successive periods; and control signal supply means for supplying said control signal to said controllable predictive quantizing means to make said controllable predictive quantizing means produce said quantized signal with a zero substituted for said prediction error signal when said control signal indicates said predetermined value;

said picture signal encoding device encoding said motion vector signal and said quantized signal into a picture output signal with said motion vector signal encoded irrespective of said control signal and with said prediction error signal and said zero signal selectively used to form said quantized signal responsive to said control signal.

* * * * *

UNITED STATES PATENT AND TRADEMARK OFFICE
CERTIFICATE OF CORRECTION

PATENT NO.   : 5,453,791
DATED        : September 26, 1995
INVENTOR(S)  : Junichi OHKI It is certified that error(s) appears in the above-identified patent and that said Letters Patent is hereby corrected as shown below:

Col. 5, line 52, delete "V", insert --$\vec{V}$--.

Col. 13, line 16, delete "V", insert --$\vec{V}$--.

Col. 15, line 2, delete "V", insert --$\vec{V}$--.

Col. 20, line 47, after "not", insert --, respectively,--.

Col. 22, line 9, delete "valve", insert --value--.

Col. 24, line 33, after "vector", insert --detector--.

Signed and Sealed this

Eleventh Day of June, 1996

Attest:

BRUCE LEHMAN

*Attesting Officer*   *Commissioner of Patents and Trademarks*